(12) United States Patent
Booker et al.

(10) Patent No.: US 12,683,868 B1
(45) Date of Patent: Jul. 14, 2026

(54) SYSTEMS AND METHODS FOR RISK SIMULATION BASED TRANSACTION ROUTING

(71) Applicant: BlackRock Finance, Inc., New York, NY (US)

(72) Inventors: Thomas Booker, New York, NY (US); Misha Van Beek, New York, NY (US); Bingxu Chen, New York, NY (US); David Greenberg, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 105 days.

(21) Appl. No.: 18/911,039

(22) Filed: Oct. 9, 2024

Related U.S. Application Data

(63) Continuation-in-part of application No. 18/486,737, filed on Oct. 13, 2023, and a continuation-in-part of application No. 17/501,832, filed on Oct. 14, 2021, now abandoned.

(60) Provisional application No. 63/379,484, filed on Oct. 14, 2022.

(51) Int. Cl.
*H04L 41/14* (2022.01)
*H04L 41/0823* (2022.01)

(52) U.S. Cl.
CPC ........ *H04L 41/145* (2013.01); *H04L 41/0836* (2013.01)

(58) Field of Classification Search
CPC .......................... H04L 41/145; H04L 41/0836
See application file for complete search history.

(56) References Cited

U.S. PATENT DOCUMENTS

| | | | | |
|---|---|---|---|---|
| 8,086,524 B1 * | 12/2011 | Craig | ..................... | G06Q 40/03 705/38 |
| 2009/0112774 A1 | 4/2009 | Meucci et al. | | |
| 2011/0238550 A1 * | 9/2011 | Reich | ..................... | G06Q 40/02 705/35 |
| 2013/0262338 A1 | 10/2013 | Shah et al. | | |
| 2013/0311352 A1 | 11/2013 | Kayanuma et al. | | |
| 2016/0373478 A1 * | 12/2016 | Doubleday | .............. | G06F 8/65 |
| 2018/0101910 A1 | 4/2018 | Smith et al. | | |
| 2019/0190962 A1 * | 6/2019 | Latham | .............. | H04L 63/1425 |
| 2021/0214183 A1 * | 7/2021 | Koskinen | ............... | B66B 1/468 |
| 2022/0101438 A1 | 3/2022 | Gao et al. | | |
| 2022/0198015 A1 * | 6/2022 | Webster | ................. | G06F 21/57 |

* cited by examiner

*Primary Examiner* — Viet D Vu
(74) *Attorney, Agent, or Firm* — Haynes and Boone, LLP

(57) ABSTRACT

Embodiments described herein further provide a routing server for routing incoming transaction requests based on a stochastic simulation of future risk level, e.g., demand flows such as required network resource, and/or the like.

20 Claims, 27 Drawing Sheets

Figure 3C:
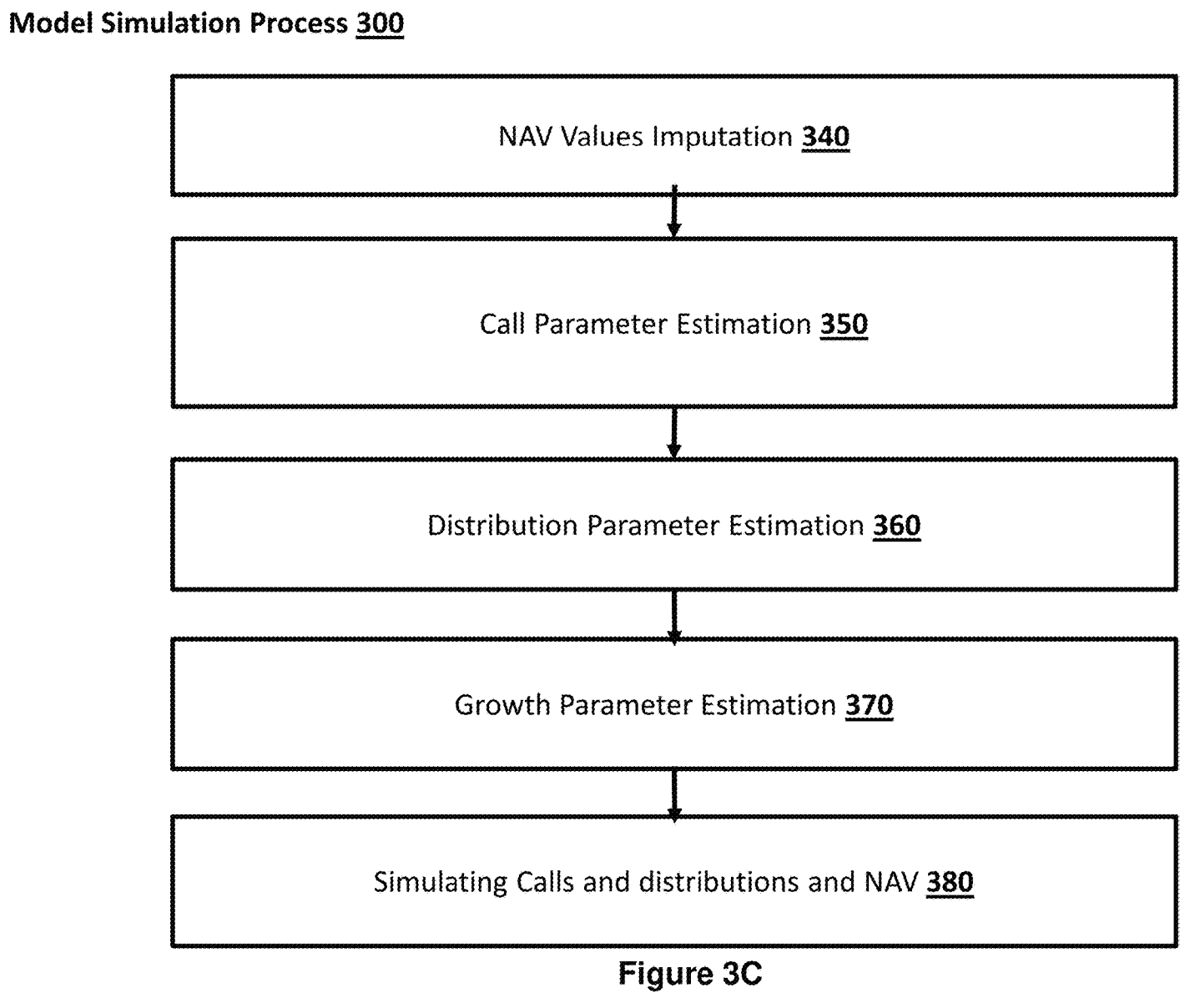

Model Simulation Process 300

NAV Values Imputation 340

Call Parameter Estimation 350

Distribution Parameter Estimation 360

Growth Parameter Estimation 370

Simulating Calls and distributions and NAV 380

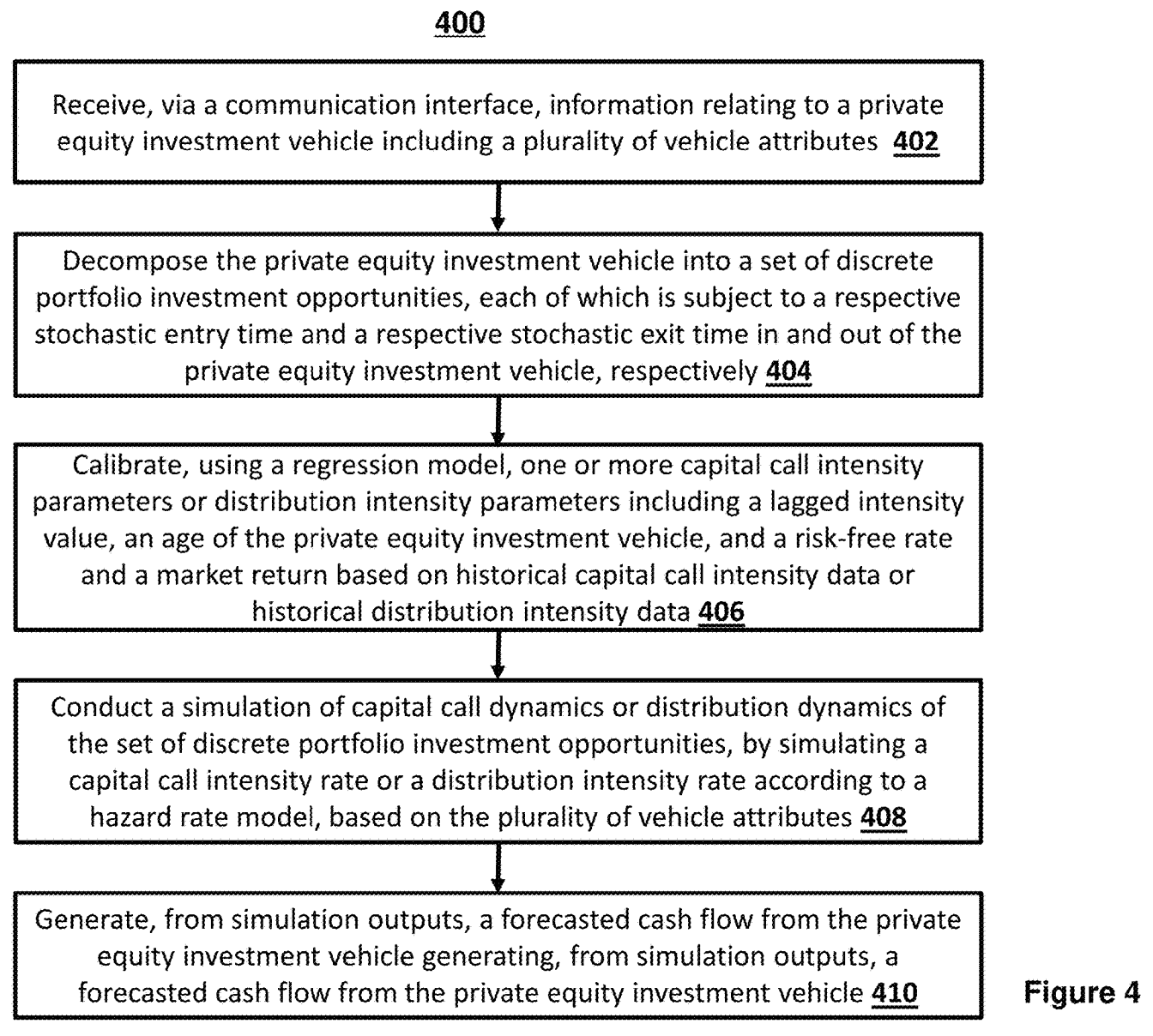

Receive, via a communication interface, information relating to a private equity investment vehicle including a plurality of vehicle attributes 402

↓

Decompose the private equity investment vehicle into a set of discrete portfolio investment opportunities, each of which is subject to a respective stochastic entry time and a respective stochastic exit time in and out of the private equity investment vehicle, respectively 404

↓

Calibrate, using a regression model, one or more capital call intensity parameters or distribution intensity parameters including a lagged intensity value, an age of the private equity investment vehicle, and a risk-free rate and a market return based on historical capital call intensity data or historical distribution intensity data 406

↓

Conduct a simulation of capital call dynamics or distribution dynamics of the set of discrete portfolio investment opportunities, by simulating a capital call intensity rate or a distribution intensity rate according to a hazard rate model, based on the plurality of vehicle attributes 408

↓

Generate, from simulation outputs, a forecasted cash flow from the private equity investment vehicle generating, from simulation outputs, a forecasted cash flow from the private equity investment vehicle 410

Figure 4

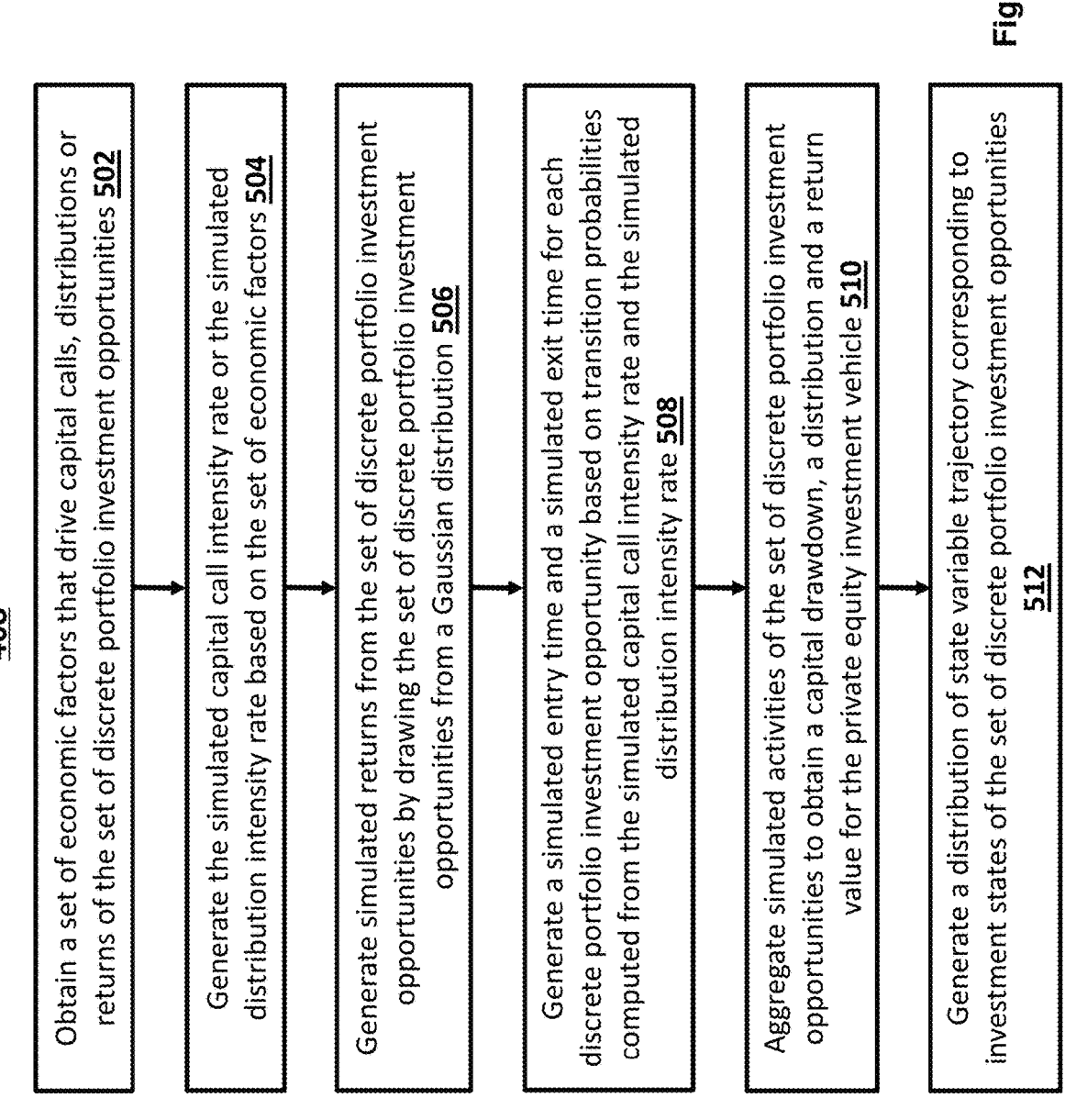

408

Obtain a set of economic factors that drive capital calls, distributions or returns of the set of discrete portfolio investment opportunities 502

Generate the simulated capital call intensity rate or the simulated distribution intensity rate based on the set of economic factors 504

Generate simulated returns from the set of discrete portfolio investment opportunities by drawing the set of discrete portfolio investment opportunities from a Gaussian distribution 506

Generate a simulated entry time and a simulated exit time for each discrete portfolio investment opportunity based on transition probabilities computed from the simulated capital call intensity rate and the simulated distribution intensity rate 508

Aggregate simulated activities of the set of discrete portfolio investment opportunities to obtain a capital drawdown, a distribution and a return value for the private equity investment vehicle 510

Generate a distribution of state variable trajectory corresponding to investment states of the set of discrete portfolio investment opportunities 512

Figure 5

Panel A: Capital Call Intensity Parameter Calibration

| | BO | | VC | |
|---|---|---|---|---|
| | Full | Selected | Full | Selected |
| Average capital drawdown intensity | 0.38*** | 0.39*** | 0.37*** | 0.37*** |
| | (0.03) | (0.03) | (0.03) | (0.03) |
| Time (Fund Age) | 0.04*** | 0.04*** | 0.04*** | 0.04*** |
| | (0.01) | (0.01) | (0.01) | (0.01) |
| Risk-free rate | 3.67* | 3.60* | 3.49* | 3.49* |
| | (1.74) | (1.71) | (1.67) | (1.67) |
| Market | 0.04 | | 0.10* | 0.10* |
| | (0.08) | | (0.06) | (0.06) |
| Lagged intensity | 0.58*** | 0.58*** | 0.54*** | 0.54*** |
| | (0.11) | (0.12) | (0.06) | (0.06) |
| Drawdown idio vol | 0.32 | 0.31 | 0.39 | 0.40 |
| # Observation | 36661 | 36661 | 24002 | 24002 |
| Adjusted R-sq | 0.27 | 0.27 | 0.3 | 0.3 |

Figure 7A

Panel B: Distribution Intensity Parameter Calibration

| | BO | | VC | |
|---|---|---|---|---|
| | Full | Selected | Full | Selected |
| Average distribution intensity | 0.23*** | 0.23*** | 0.18*** | 0.18*** |
| | (0.02) | (0.02) | (0.03) | (0.03) |
| Time | 0.02** | 0.02** | 0.02** | 0.02** |
| | (0.01) | (0.01) | (0.002) | (0.002) |
| Risk-free rate | 3.31** | 3.32*** | 4.61** | 4.99** |
| | (1.20) | (1.20) | (1.54) | (1.61) |
| Market | 0.01 | | 0.08** | 0.08* |
| | (0.04) | | (0.04) | (0.04) |
| Lagged intensity | 0.14** | 0.14** | 0.08 | |
| | (0.04) | (0.04) | (0.09) | |
| Distribution idio vol | 0.41 | 0.41 | 0.21 | 0.20 |
| # Observation | 34493 | 34493 | 22358 | 22358 |
| Adjusted R-sq | 0.16 | 0.16 | 0.14 | 0.14 |

Figure 7B

|  | BO | | VC | |
| --- | --- | --- | --- | --- |
|  | 1-factor | 3-factor | 1-factor | 3-factor |
| $\alpha$ | 0.06** | 0.02* | 0.00 | -0.01 |
|  | (0.02) | (0.01) | (0.01) | (0.01) |
| $\beta_{MKT}$ | 1.30*** | 1.25*** | 1.71*** | 1.62*** |
|  | (0.25) | (0.27) | (0.30) | (0.31) |
| $\beta_{size}$ |  | 0.33 |  | 0.53 |
|  |  | (0.41) |  | (0.41) |
| $\beta_{value}$ |  | 0.45 |  | -0.49 |
|  |  | (0.38) |  | (0.47) |

Figure 7C

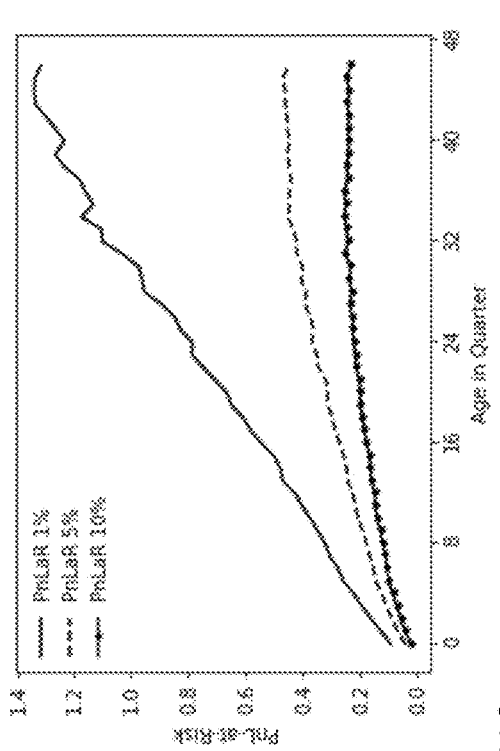
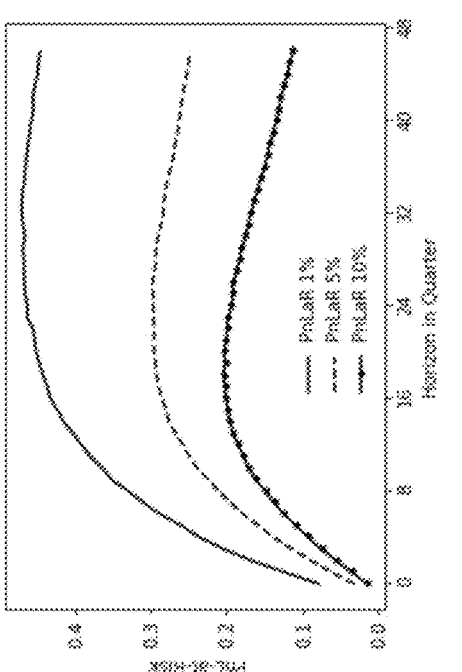
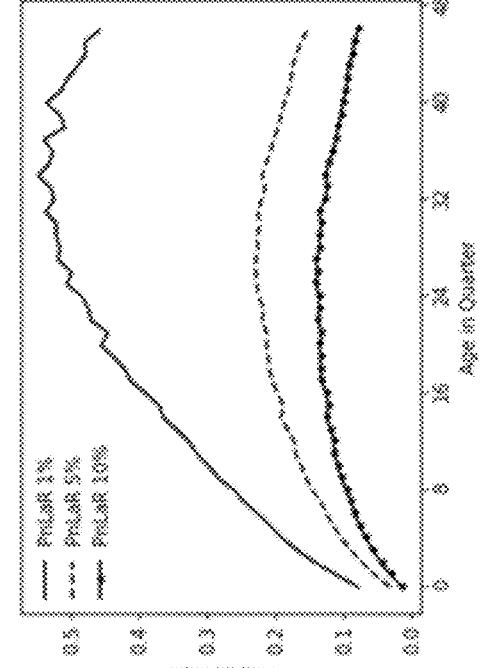
Figure 11A

Panel A: BO CBaR at Fund Inception as a Function of Horizon
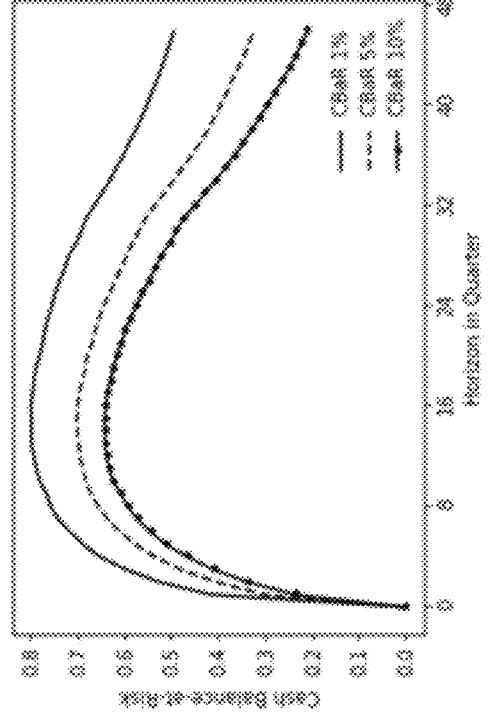
Panel B: VC CBaR at Fund Inception as a Function of Horizon
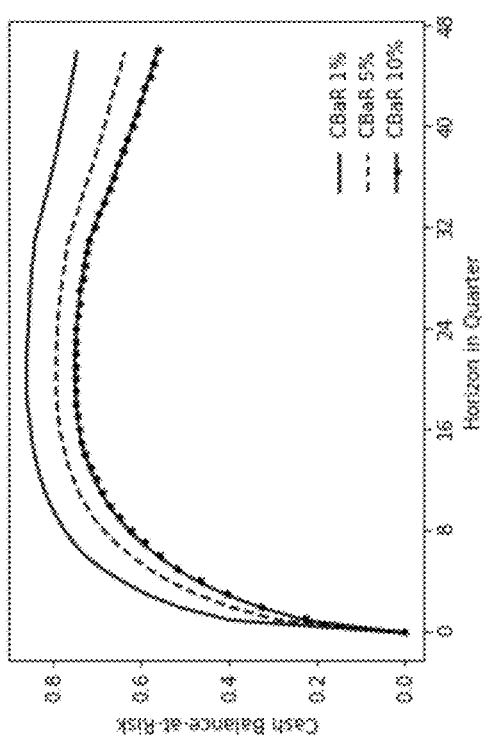
Panel C: BO 1-Year Horizon PnLaR as a Function of Time
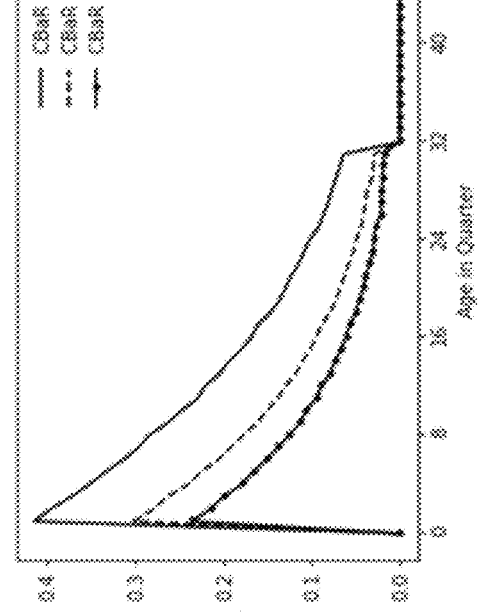
Panel D: VC 1-Year Horizon PnLaR as a Function of Time
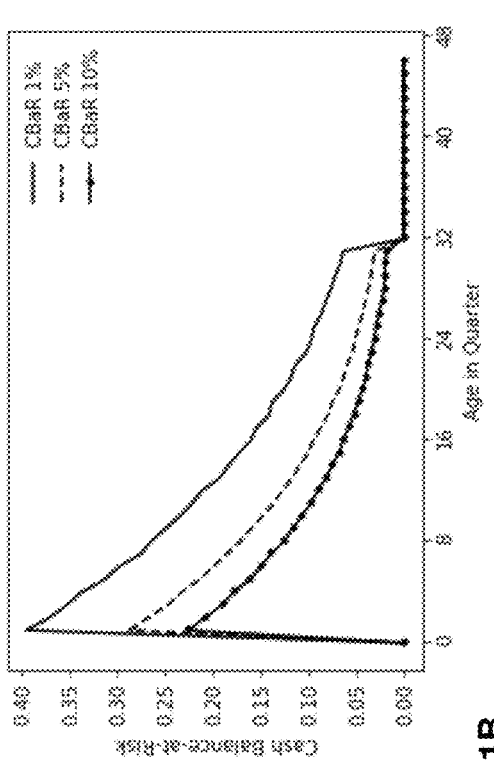
Figure 11B

Panel A: BO
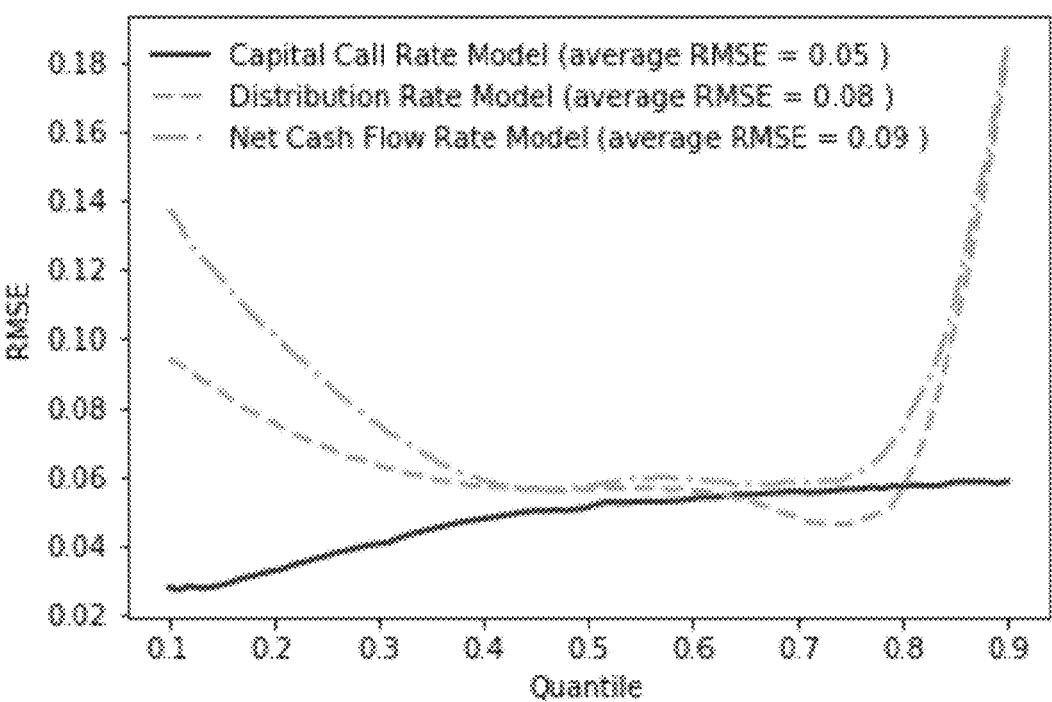
Panel B: VC
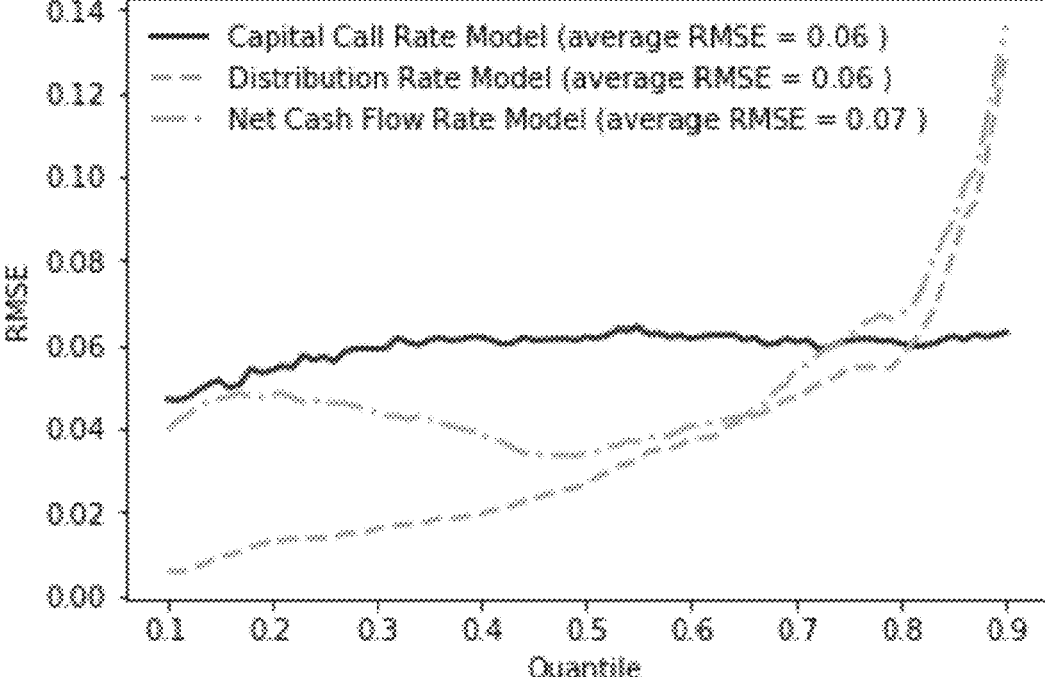
Figure 12

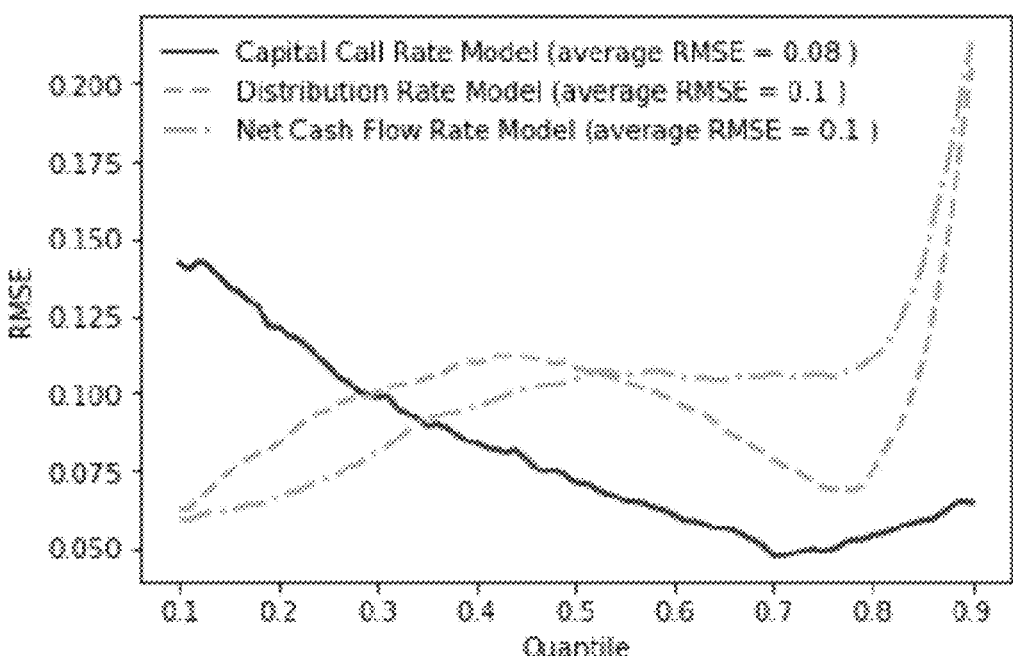
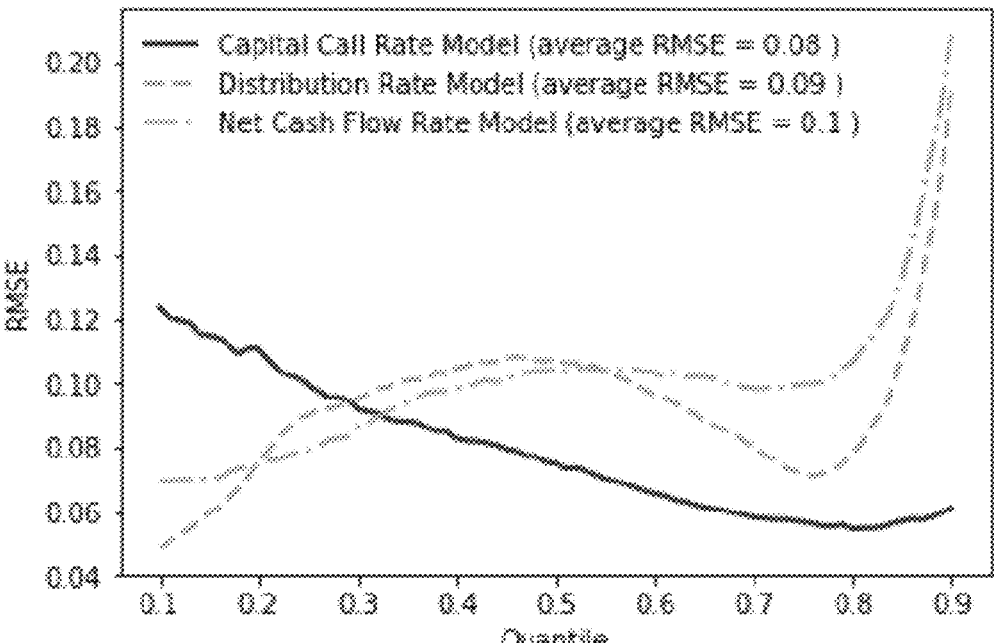
Figure 13

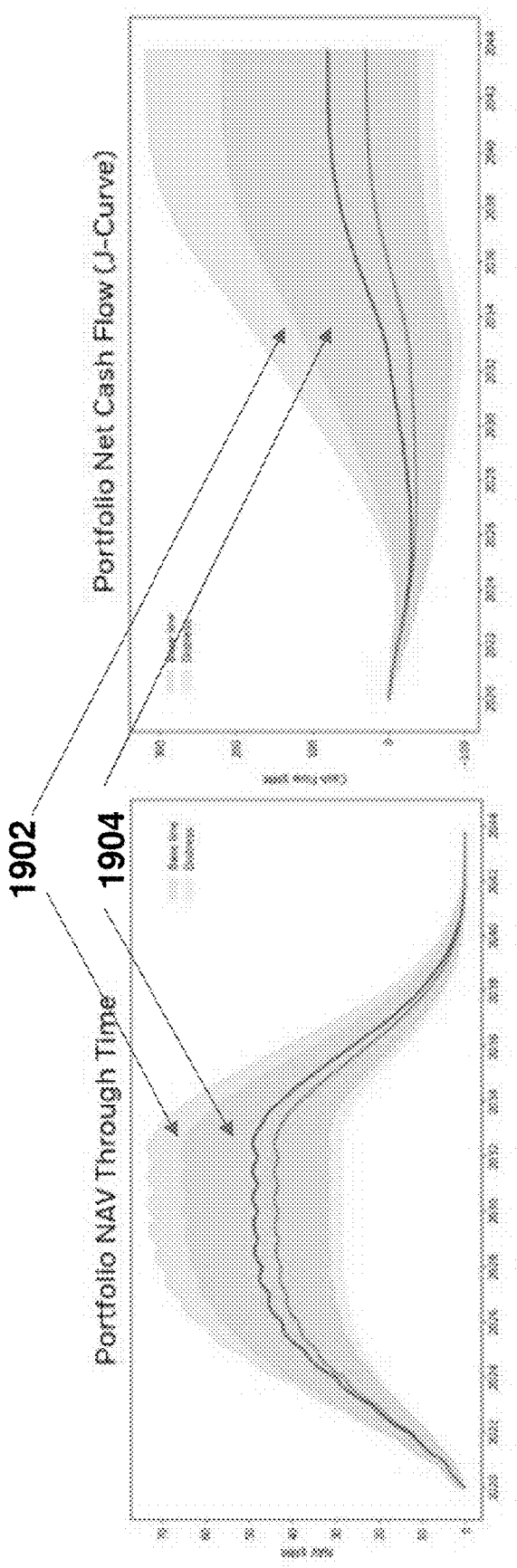
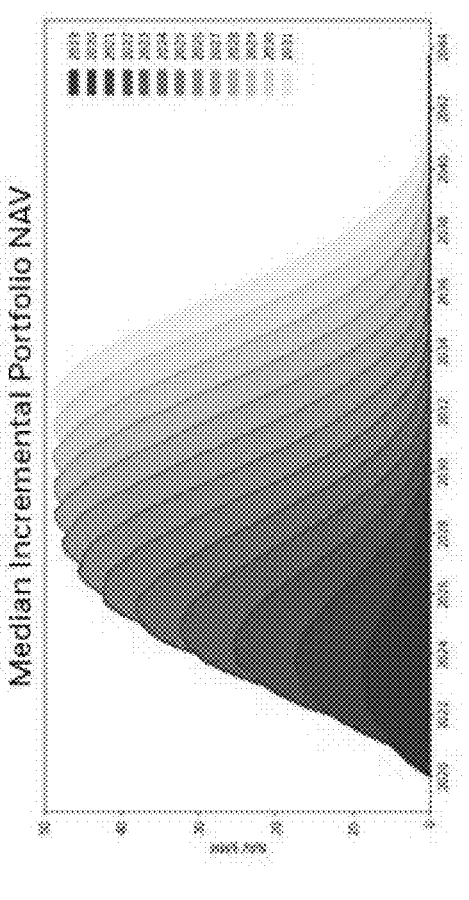
Figure 20

SYSTEMS AND METHODS FOR RISK SIMULATION BASED TRANSACTION ROUTING

PRIORITY CLAIMS

The present disclosure is a continuation-in-part and claims priority to co-pending and commonly-assigned U.S. nonprovisional application Ser. No. 17/501,832, filed Oct. 14, 2021.

The present disclosure is also a continuation-in-part and claims priority to co-pending and commonly-assigned U.S. nonprovisional application Ser. No. 18/486,737, which is a nonprovisional of and claims priority to U.S. provisional application No. 63/379,484 filed Oct. 14, 2022; and also is a continuation-in-part application of and claims priority to U.S. nonprovisional application Ser. No. 17/501,832, filed Oct. 14, 2021.

The aforementioned applications are hereby expressly incorporated by reference herein in their entirety.

TECHNICAL FIELD

The present disclosure relates generally to network resource allocation, and more specifically, to systems and methods for using stochastic simulation to allocate network resource to incoming network traffic.

BACKGROUND

In a dynamic system, resource allocation may be designed to meet the varying demands of different types of tasks or services. As demand fluctuates, the system must continuously adapt by reallocating resources such as power, bandwidth, or processing capacity to ensure that high-priority or time-sensitive tasks are adequately supported, while still maintaining efficiency for lower-priority tasks. This flexibility helps optimize overall system performance and prevent resource bottlenecks.

For example, a network gateway is responsible for managing and allocating resources like power, bandwidth, and other critical network capacities to different classes of incoming traffic based on their priority or quality of service (QoS) requirements. It ensures optimal network performance by dynamically adjusting these resources according to traffic demands. For example, higher-priority traffic such as voice or video calls may receive more bandwidth and power to maintain low latency and high quality, while lower-priority data, like emails or file transfers, might be assigned fewer resources. By efficiently distributing resources, the gateway helps balance the network load and maintain overall system stability.

For another example, financial investment institutions (and/or investors) may allocate their resource to different classes of financial vehicles including private equity (PE) to achieve investment targets and diversify their portfolios. A PE investment vehicle, such as a PE fund, often entails a contractual commitment of capital to be called upon request, e.g., generating cash flows. If capital is called during adverse market conditions, PE investors may be forced to sell illiquid securities or their PE investment itself at distressed prices. This transaction risk can be costly for both the investor and the PE vehicle. Despite such time consuming and labor-intensive review process, capturing and predicting the risk of allocating resource to an PE fund remains challenging.

BRIEF DESCRIPTION OF THE DRAWINGS

FIG. 4 provides an example logic flow diagram illustrating an example simulation process performed by the PE cash flow model, according to one embodiment described herein.

FIG. 5 provides an example logic flow diagram illustrating an example process of conduct a simulation of capital call dynamics or distribution dynamics of the set of discrete portfolio investment opportunities, according to one embodiment described herein.

FIGS. 7A-7C provide data tables of example calibration parameters, according to embodiments described herein.

FIGS. 10A-20 show example data plots that may be displayed within an example UI application of FIG. 9, according to one or more embodiments described herein.

Figure 1A:
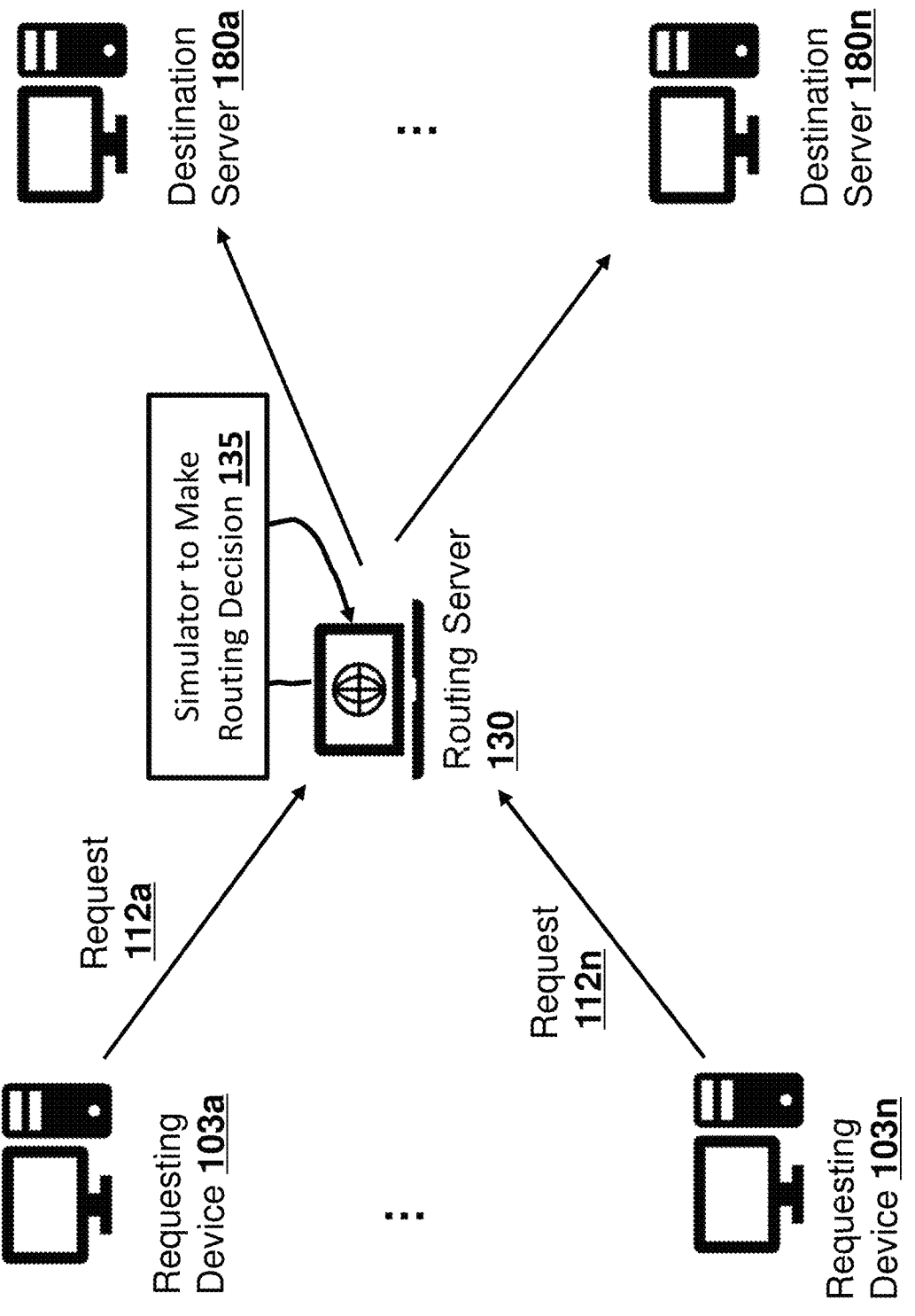
FIG. 1A is a simplified diagram illustrating an aspect of a routing framework that processes and routes incoming network requests within a network, according embodiments described herein.

In the figures and appendices, elements having the same designations have the same or similar functions.

DETAILED DESCRIPTION

In a dynamic system such as a communication network, a transaction processing network, and/or the like, a routing server such as a gateway, or a dedicated traffic handler may process various types of incoming network traffic. For example, the network traffic may comprise different types of network access requests originating from different types of network applications, such as video streaming, electronic mail, voice over Internet Protocol, financial transactions, and/or the like. The network access request may comprise a request to access network resource (such as bandwidth, power, electronic trading exchange, and/or the like). The routing server may thus decide and route the network access request to a destination accordingly, to achieve the desired network resource. Once the network access request is routed to its destination and the network resource is allocated according to the request, a network application (e.g., video streaming application, voice over IP application, financial transaction application, etc.) may be instantiated using the allocated network resource. Further demands of running the network application may occur, such as additional demands to use additional network resource, which may negatively impact QoS of other types of network traffic.

For example, a video streaming application may comprise multiple sessions of video streaming, and/or different volume of video data (e.g., when the streamed video goes from regular definition to high definition), and may demand higher bandwidth in the future. To maintain such QoS for the video streaming application, should the routing server continue to route video packets and allocate additional bandwidth for the access request, bandwidths that were previously reserved for other applications may be affected. Overall utility of the network supporting different types of traffic may be adversely affected.

For another example, when the network access request comprise a transaction request of an illiquid asset, such as a private equity (PE) vehicle and/or the like. A PE investment vehicle, such as a PE fund, often entails a contractual commitment of capital to be called upon request, e.g., generating cash flows. When the capital is called during adverse market conditions, this transaction risk can be costly for both the requestor of the transaction request and the PE vehicle. Overall utility of the financial transaction system may be adversely affected.

Embodiments described herein provide a routing server for routing incoming transaction requests based on a stochastic simulation of future risk level, e.g., demand flows such as required network resource such as cash flow, and/or the like. For example, a network access request comprising information relating to a network application including a plurality of application attributes may be received at the routing server. The routing server may then decompose the network application into a set of discrete execution processes, each of which is subject to a respective stochastic entry time and a respective stochastic exit time in and out of the network application, and a respective stochastic waiting time having a hazard-based duration, respectively. The respective stochastic entry time or the respective stochastic exit time takes a form of a hazard rate model subject to an exponential process with time-varying coefficients. A hardware-based stochastic simulator may conduct a stochastic simulation of entry dynamics or exit dynamics of the set of discrete execution processes based at least in part on simulating a stochastic entry intensity rate or an exit intensity rate according to a hazard rate model, based on the plurality of application attributes. Then the hardware based simulator may generate, from simulation outputs, a predicted risk level associated with a forecasted demand flow from the network application over a future period, based on which to generate a routing decision for the network access request based on the predicted risk level.

For example, the network access request may comprise a request to establish a video streaming channel through the network for a network application of video streaming. Such network application may be decomposed into a number of discrete execution processes, e.g., video streaming sessions. The stochastic start (entry) time and end (exit) time of each video streaming session may thus be simulated by the hardware-based simulator to simulate a forecasted future resource demand, such as additional bandwidth. A risk of bandwidth overloading is thus predicted.

For another example, when the network access request comprise a transaction request of an illiquid asset from a requester server to initiate a transaction with a destination server. Such illiquid asset, such PE vehicle, may be decomposed into discrete portfolio investment opportunities. The stochastic start (entry) time and end (exit) time of each discrete portfolio investment opportunity may thus be simulated by the hardware-based simulator to predict the cash flow of a PE vehicle over a future time period.

In one embodiment, the routing server may cause a display of a visualization of the predicted risk level over a period of time on a user interface, e.g., as further illustrated in FIGS. 9-20. The routing server may receive, via the user interface, a user input that continuously move a marker on the user interface to indicate a changed time period, and thus cause an updated display of a visualization of an updated predicted risk level over the changed time period on the user interface.

In one embodiment, the routing server may decline the network access request when the predicted risk level indicates a high risk, and block future network access or transaction requests from the requestor server or relating to a target server.

In one embodiment, a routing lookup table may be employed to route the network access request to a destination server when the predicted risk level indicates an acceptable risk.

In one embodiment, specifically when the network access request comprises a transaction request relating to illiquid assets, PE cash flows are simulated using stochastic simulation to predict a future risk level. Traditionally, only deterministic simulation was adopted. For example, the Takahashi-Alexander model (described in Takahashi et al., Illiquid alternative asset fund modeling, the Journal of Portfolio Management, 28(2):90-100, 2002) describes the calls rate RCa, the distribution rate RDa, and the net asset value (NAV) growth rate RGa as a function of fund age a, and can give projections of future cash flows Ca, distributions Da and NAV Va based on these rates. The dynamics are expressed as follows:

$$C_a = RC_a\left(1 - \sum_{j=0}^{a-1} C_j\right),$$

$$D_a = RD_a \times V_{a-1} \times (1 + BG_a),$$

$$V_a = V_{a-1} \times (1 + RG_a) + C_a - D_a,$$

$$V_0 = 0.$$

The first equation describes how the call rate acts on all uncalled capital, here normalized to a total commitment of one. Distributions are a fraction of NAV (after growth to reflect the end of a period) in the second equation. Finally, NAV grows through the growth rate, and calls and distributions adjust it at period end in the third equation. For new funds the dynamics could start at a=0 and project all cashflows onward. For existing funds, the model can start at later age a>0 and from a known NAV, Va, and sum of historical calls, $$\sum_{j=0}^{a-1} C_j.$$

In this deterministic model, the call rate is the fraction of uncalled capital that gets called in a given period, the distribution rate is the fraction of NAV that is distributed to the private fund in a given period, and the growth rate is the return on the NAV (analogous to asset return in public markets). While widely used to manage cashflows, this model is deterministic in the sense that all three rates are fixed numbers without uncertainty. Therefore, the Taka-hashi-Alexander model cannot account for either the struc-tural or the idiosyncratic cash flow risks. The public market equivalent would be to manage a portfolio based solely on mean returns, and ignoring both the volatility of risk drivers and idiosyncratic returns.

In view of the need for a PE cash flow simulation model that accounts for the stochastics and uncertainty of risk and returns, embodiments provide PE cash flow simulator that provides a graphical user interface (GUI) displaying simu-lated cash flow trajectory over time based on dynamically updated fund and/or economic factors. In one embodiment, a user may configure fund information, asset class, and in turn configure data sources for obtaining fund data records. A computing device may obtain fund data records remotely from data vendors through one or more data loading inter-faces such as application programming interfaces, and parse the fund data records to generate time-series data represent-ing call and/or distribution events. The time-series data may then be used to estimate call and/or distribution parameters that capture the randomness of such events, may be used for simulating a life cycle of one or more funds.

In this way, the PE cash flow simulator generates a visualization of simulation results that facilitates a user (e.g., an investor, etc.) to make investment decisions. As the simulation may be constantly updated according to updated fund data records and/or economic factors, the visualization of simulation results may constantly update accordingly. The simulation carried out using random generation technology may capture randomness of call and/or distribution events of real-world fund performance, and thus provide a more accurate projection of fund performance which existing technology is not able to. Financial technology in real-time financial data aggregation and simulation is thus improved.

Embodiments described herein provide a model of private equity vehicle that simulates a cash flow performance of a PE vehicle throughout its investment life cycle, which may be used to quantify the probability that an investor will face a liquidity event over the life of its PE investments. Spe-cifically, a system implementing the PE cash flow model decomposes a stylized PE fund into a series of discrete portfolio company investments, each subject to stochastic entry and exit times into the PE fund. The stochastic entry and exit may be represented as two separate hazard rate models using an exponential process with time-varying coefficients. This time-variation enables the PE cash flow model to reflect any procyclical behavior in capital calls and distributions.

In one embodiment, the PE cash flow model may simulate the evolution of a portfolio company's value throughout its holding period using a multi-factor risk model. Fund-level paths of capital calls, distributions and values are con-structed through the aggregation of these simulated portfolio companies. In this way, the investment process of the stylized PE fund may be simulated via a "bottom-up" manner.

For example, the entry, exit and factor risk parameters of each portfolio company investment can be calibrated based on a broad-based set of historical fund cash flow data. For example, an example dataset used covers U.S. funds raised between 1997 and 2015, split between venture capital (VC) and buyout (BO) investment strategies. Calibrated param-eters are used to generate population distributions of pro-jected capital calls, fund distributions and fund valuations using Monte-Carlo simulation.

Embodiments described herein further provide a cash flow and risk model that adds randomness to the calls rate $RC_a$, the distribution rate $RD_a$, and the net asset value (NAV) growth rate RGa in the otherwise deterministic Takahashi-Alexander model described above. Starting with the call and distribution rates for a given private asset class—by construction, both rates lie in the [0, 1] interval—the GP often cannot call more than the remaining uncalled commitments, and cannot distribute more than the total NAV. Rates of exactly zero or one are often observed (all remaining capital is called, all remaining NAV is distributed, or nothing is called or distributed), but anything in between is also possible. Therefore, the call and distribution rates are formulated as a censored distribution. The uncensored latent variable $\lambda$ is the sum of a systematic factor f that is shared across funds, and an idiosyncratic component $\eta$. The fol-lowing expressions describe this structure, with censoring on the left and the sum of systematic and idiosyncratic components on the right:

$$RC_{i,a} = \min\{\max\{\lambda_{i,a}^C, 0\}, 1\}, \quad \lambda_{i,a}^C = f_{v_i+a}^C + \eta_{i,a}^C,$$

$$RD_{i,a} = \min\{\max\{\lambda_{i,a}^D, 0\}, 1\}, \quad \lambda_{i,a}^D = f_{v_i}^D + \eta_{i,a}^D,$$

where $v_i$ is the vintage of fund i, such that $t=v_i+a$ is the clock time. The descriptions for calls and distributions are struc-turally the same, but with each their own systematic factor f that does not depend in the fund i. The above equations describe call and distribution rates as function of the fund age but are coupled through this common factor.

In one embodiment, the idiosyncratic components may be formulated using a heavy-tailed distribution. The means and variances are also strongly dependent on the age of the fund, e.g., $$\eta_{i,a}^C \sim t_2(\mu_a^C, \sigma_a^C),$$

$$\eta_{i,a}^D \sim t_1(\mu_a^D, \sigma_a^D),$$

where $t_v(\mu, \sigma)=\mu+\sigma t_v$ with $t_v$ a Student-T distribution with v degrees of freedom. The systematic drivers are modeled jointly with growth rates. The growth rates themselves follow a log-normal distribution based on a factor model, i.e., $$\log(RB_{i,a}) = X_i^T f_{v_i+a}^G + \eta_{i,a}^G,$$

$$\eta_{i,a}^G \sim \mathcal{N}(\mu_i^G, \sigma_i^G),$$

The growth factors $$f_t^G$$

and the exposure $X_i$ are taken directly from a risk model. Unlike for calls and distributions, the idiosyncratic mean and volatility depends on the fund i and not age a. That is, they are constant during a fund's lifetime, but vary fund-by-fund even within the same private asset class.

Therefore, the joint dynamics of the systematic factors, $$\left(f_t^C, f_t^D, f_t^G\right)$$

may be modeled by ESS Economies & Factor Trajectory Simulator 301 shown in FIG. 3. Within the simulator, the systemic factors driving calls and distributions are models as AR(1) processes with correlated shocks, whereas the growth factors are more akin to public factors that exhibit little auto-correlation.

In one embodiment, a hardware-based stochastic simulator may jointly and stochastically simulate call dynamics, distribution dynamics and therefore a cash flow dynamics. By using a hardware-based stochastic simulator to jointly simulate system dynamics $$(f_t^C, f_t^D, f_t^G),$$

instead of running different threads of separate Monte-Carlo simulation for each dynamic factor, computational overhead at the routing server may be alleviated. In this way, computational complexity can be largely reduced in real world applications. With reduced computational complexity, hardware efficiency, such as the total number of read and write operations between processors and memories, the required memory space for storing intermediate variables during computational operations, can be largely improved at the routing server. With improved computational efficiency, routing decisions may be made in almost real-time in response to incoming transaction requests.

In one embodiment, the routing server may assign a risk level to a transaction request based on the simulation results (e.g., future cash flows, etc.) and generate a routing decision for the transaction request based on the predicted risk level. For example, when the predicted risk level is undesirable (e.g., probability of a forced sale to generate demanded cash flow is higher than a threshold, low security rating, etc.), the routing server may decline the transaction request and block future transaction requests from the requestor server or relating to the target server. Alternatively, when the predicted risk level indicates an acceptable risk (e.g., probability of a forced sale to generate demanded cash flow is lower than threshold, or high credit rating, etc.), the routing server may route, by a routing lookup table, the transaction request to a destination server.

In one embodiment, the predicted risk level associated with the transaction request may be time-sensitive, and the time-varying risk levels may be interactively provided via a user interface. For example, the routing server may cause a display of a visualization of the predicted risk level over a period of time on a user interface. When a user input that continuously moves a marker on the user interface to indicate a changed time period is received, the routing server may continuously update the simulation of rating migration, and cause an updated display of a visualization of an updated predicted risk level over the changed time period on the user interface. In some implementations, a user may input additional parameters such as a risk threshold, and/or a decision to accept and/or decline the transaction request.

In this way, the routing server may route transaction requests based on risk-levels associated with such transaction requests almost in real time, while filtering high-risk and potentially harmful malicious traffic. Efficiency and security of the system, such as a financial trade system, is improved.

It is to be noted that while some embodiments described herein relates to simulating a risk due to future demand flows associated with a transaction request, the hardware-based simulator and the risk simulation may be applied to simulating different types of requests associated with network resource access requests. For example, the call dynamics, distribution dynamics, and cash flow dynamics may each represent a demanded network resource (such as bandwidth) by a type of network traffic (e.g., streaming, electronic mail, voice over IP, and/or the like), the released network resource, and the remaining available network resource at a network system. A gateway may then use the simulated risk associated with a network resource access request in the incoming traffic, e.g., whether demanded further network resource would exceed available bandwidth for the particular type of network traffic, to route such network resource access request to its destination server, and allocate network resource accordingly. In this way, routing technology thus improves the overall utility performance of the network.

As used herein, the term "PE vehicle" or "PE investment vehicle" which may be used interchangeably refers to a closed-end fund, structured as a "partnership" with a limited lifetime, that invests in unlisted companies. The fund may be originated and operated by the general partner (GP) which is often, but not always, a specialized PE firm. For example, the GP may often raise capital commitments from institutional investors, who constitute the fund's limited partners (LPs). The GP calls the LPs on these commitments—at any time throughout an agreed investment period—as investment opportunities are identified. After capital is called, it is deployed by the GP and the investment enters the fund as a portfolio company. Within the investment period the GP may call some, or all, of each LP's commitment. As portfolio companies exit the fund, the GP distributes the proceeds to its LPs in cash and/or marketable securities.

As used herein, the term "asset" refers to any liquid or illiquid investment. For example, equities and cash-risk free bonds may be examples of liquid assets, while illiquid asset may include a U.S. buyout (BO) fund.

As used herein, the term "investment opportunity" refers to any investment that is tangible or intangible, that is offered, offered for sale, sold, or traded based wholly or in part on representations, either express or implied, about past, present, or future income, profit, or appreciation. For example, a capital call position in a PE vehicle may be considered as an investment opportunity.

As used herein, the term "module" may comprise hardware or software-based framework that performs one or more functions. In some embodiments, the module may be implemented on one or more processors, neural networks, and/or the like.

Network Architecture for Risk-Simulation Based Routing

FIG. 1A is a simplified diagram illustrating an aspect of a routing framework that processes and routes incoming network requests within a network, according to embodiments described herein. A routing server 130 situates as an intermediary between different devices or systems, such as requesting devices 103a-103n and destination servers 180a-180n, ensuring that data packets are efficiently directed to their intended destination. Such routing server 130 may determine the best path for data to travel across a network or communication system. For example, routing servers may be commonly used in various types of networks, including but not limited to computer networks (Internet), voice over IP systems, content delivery networks, load balancing networks, and/or the like.

For example, the routing server 130 may receive various network access requests 112a-n to access network resources from requesting devices 120a-120n. The routing server 130 may assess the risk of the network access request 112a-112b by continuously evaluating the incoming and outgoing network traffic for signs of suspicious or harmful activity. This evaluation involves a combination of real-time traffic monitoring, anomaly detection, and rule-based filtering to identify and mitigate potential threats before they cause harm.

For example, when the network access requests 112a-112n comprises a transaction request to conduct a financial transaction with a transaction partner at one of the destination servers 180a-180n. In one implementation, the network access request 112a-112n may comprise an electronic message according to the Financial Information Exchange (FIX) Protocol. The transaction request 112 may be sent over TCP/IP network from financial server 120 to the transaction routing server 130. For example, the transaction request 112 in FIX protocol may comprise a message header identifies the message type (e.g., new order, order Modification) and other metadata, and various body fields such as order ID, ticker symbol, order type, side, quantity, price, and/or the like. In other implementations, the transaction request 112 may be transmitted as TCP/IP packets under the FIX/FAST, OUCH, ITCH protocols, and/or the like.

A simulator 135 at the routing server 130 may be instantiated to perform a stochastic simulation to model the risk of such transaction requests 112a-112n. The stochastic simulator 135 may determining a type of the transaction request 112a-112n by parsing the data payload of the request. When the request 112a-112n relates to a transaction with an underlying illiquid asset (such as a private equity fund, a real estate, and/or the like), the simulator 135 may simulate a future cash flow in response to the request 112a-112n and associated risks, such as but not limited to market risk, valuation risk, liquidity risk, opportunity cost, exit risk, counterparty risk.

In one implementation, by simulating a sequence of possible cash flow and/or risks associated with the transaction requests 112a-112n over time, the potential risk associated with the transaction requests 112a-112n may be reflected. Additional discussion of the stochastic simulation to formulate a risk of a transaction request 112a-112n may be further described below in relation to FIGS. 3A-3C.

The routing server 130 may make a routing decision 135 for the incoming network access requests 112a-112n based on risk analysis of the incoming requests 112a-112n. In this way, only requests that pass the security and/or risk analysis may be forwarded to the relevant destination server 180a-180n. For example, when routing server 130 identifies request 112a may be originated from a high risk requesting device 120a or the request 112a may expose either the requesting device 103a or a destination server 180a to a high level of future risk, request 112a may be blocked from further routing to the intended destination server 180a. In some implementation, once any traffic from requesting device 120a is identified as high risk, routing server 130 may block future traffic from requesting device 120a for a period of time, e.g., 4 hours, 24 hours, etc. In this way, high risk traffic may be blocked from accessing network resources at any destination servers 180a-180n, to avoid any malicious attacks at the destinations.

In one embodiment, the routing server 130 may be housed with a graphic user interface (GUI) such that the stochastic simulation of transaction risks may be visualized through the GUI. A user input may in turn be received to indicate a routing decision. Additional examples of GUIs may be found in FIGS. 9-20.

In one embodiment, the routing server 130 may be applied in different types of networks. For example, the routing server 130 may situate at an electronic trading network, which receives and directs transaction requests or trade orders 112a-112n from various requesting devices 120a-120n to the appropriate destination servers 180a-180n, such as but not limited to financial institutions, exchanges, or brokers for execution. The routing server 130 may make the routing decision 135 on which exchange, market maker, or liquidity provider to send the order 112a-112n to for execution. In another example, the routing server 130 may further make routing decisions for trade orders 112a-112n through different venues, splitting the order to minimize market impact, reduce slippage, or take advantage of high-frequency trading strategies.

In another example, the routing server 130 may situate at a financial payment processing network to receive and direct electronic payment transactions 112a-112n (e.g., credit card payments, wire transfers) to the appropriate acquiring banks, payment processors, or gateways (e.g., destination servers 180a-180n).

Figure 1B:
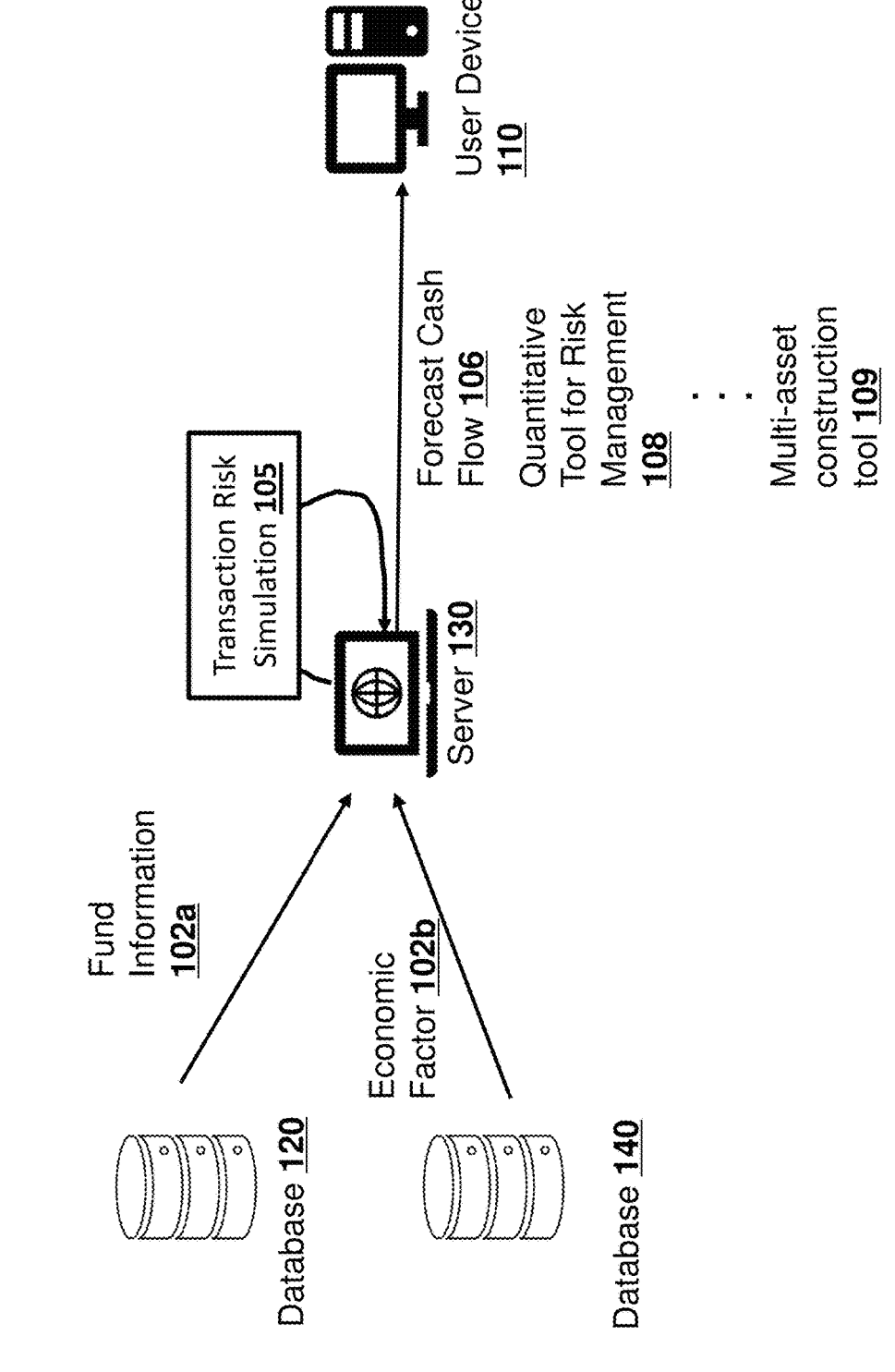
FIG. 1B is a simplified diagram illustrating a server implementing a PE cash flow model and its interactions with other related entities, according to one embodiment described herein.

In one implementation, the routing server 130 may adopt a stochastic simulation hardware (105 in FIG. 1B) to evaluate transaction risks associated with a proposed transaction from one of the requesting devices 103a-103n, as further described in FIG. 1B.

FIG. 1B is a simplified diagram illustrating a server implementing a risk simulation model and its interactions with other related entities, according to one embodiment described herein. Diagram 100 shows a server 130 that implements a risk simulation model 105, interacting with one or more databases 120 and 140, and a user device 110, and/or the like.

In one embodiment, the server 130 may receive various fund information 102 and economic data factors 102b from databases 120 and 140. Databases 120 and 140 are for illustrative purpose only, and more than two databases may be engaged with the server 130. For example, the received information 102a-b may include quarterly fund-level cash flow data that collects anonymized capital calls, distributions and fund net asset values (NAV) from participating LPs on a quarterly basis. In one implementation, the fund information 102a and/or economic factors 102b may be received in different formats. For example, economic factor 102b may be obtained in the form of one or more spreadsheets via the Bloomberg Data API, Thomson Reuters Data API, and/or the like. For another example, fund information may be obtained in the form of fund financial statements (e.g., spreadsheet, PDF files, and/or the like) containing numeric values and non-numeric values.

Figure 3A:
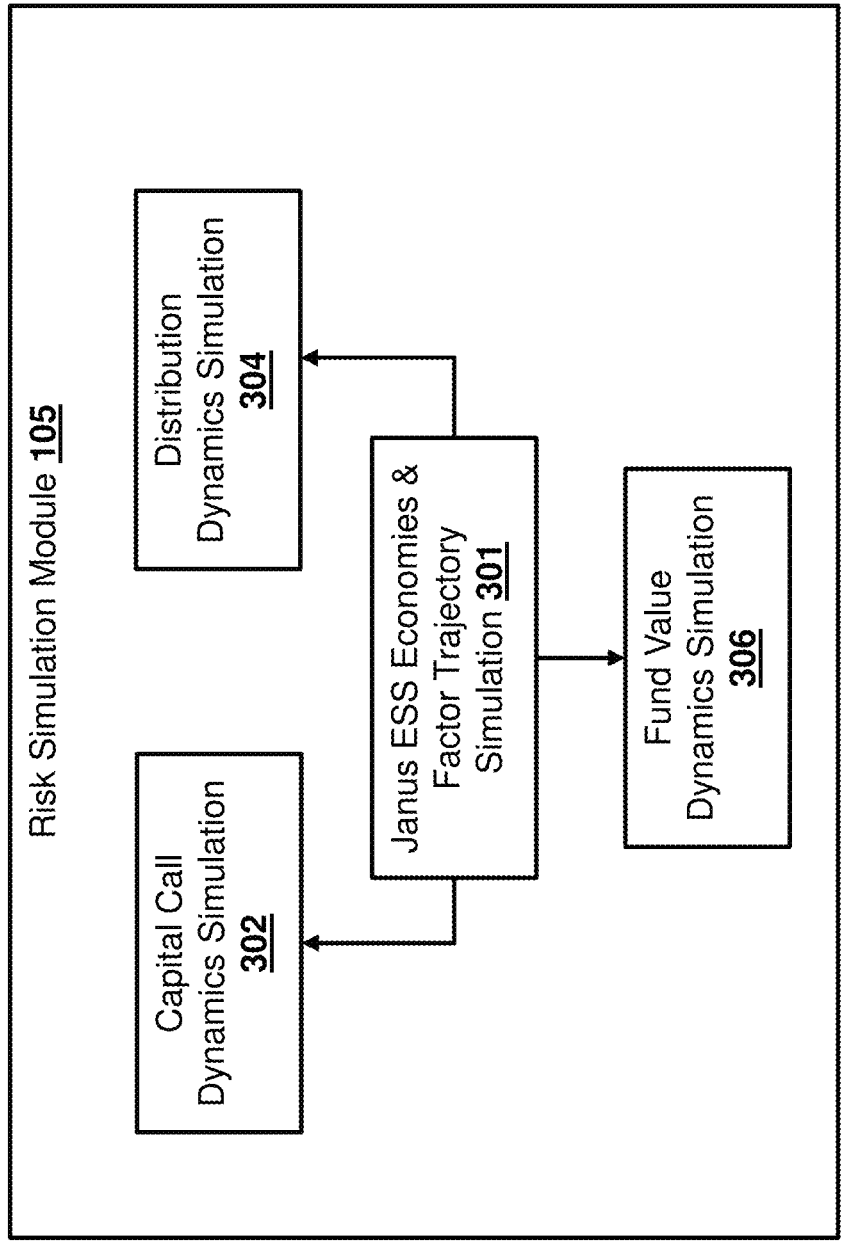
FIG. 3A provides an example diagram illustrating an example structure of the PE cash flow model described in FIGS. 1-2, according to an embodiment described herein.
Figure 3B:
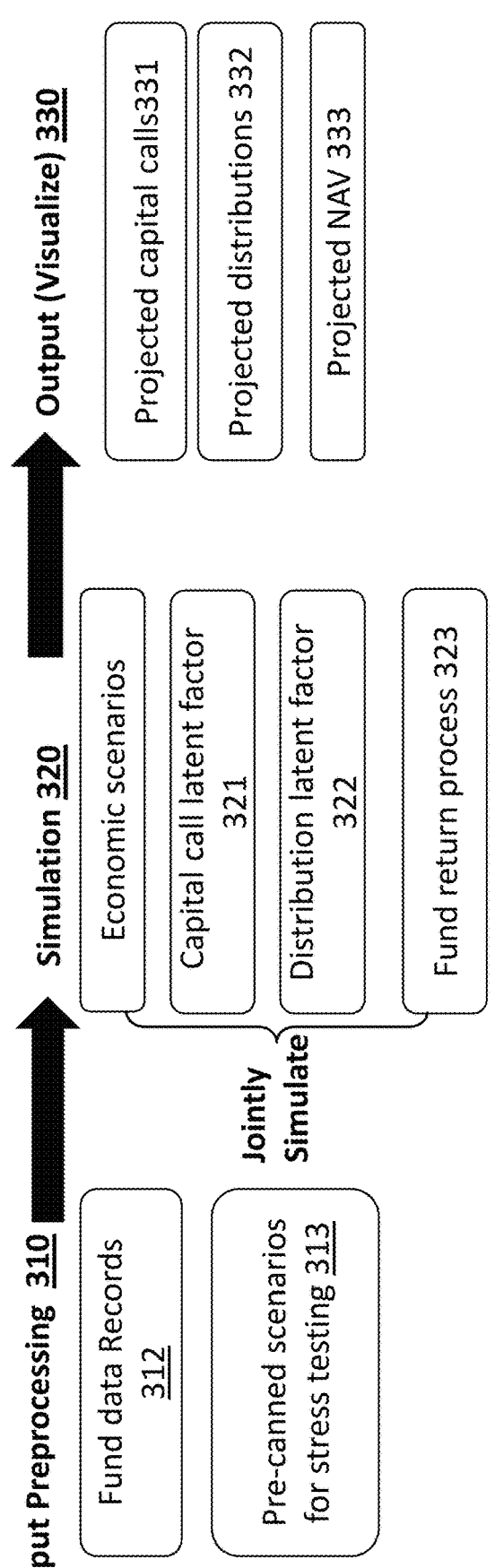
FIG. 3B provides an example logic flow illustrating an example model simulation process for the randomized Risk simulation model 105, according to one embodiment described herein.

The server 130, upon receiving the data records 102a-b, may convert the data records 102a-b into time-series data reflecting call and/or distribution events, e.g., as further described in relation to FIGS. 3A-3C.

The server 130 may then implement the Risk simulation model 105 to simulate the life cycle of investment process of one or more PE investment vehicles. For example, the Risk simulation model 105 at the server 130 may receive terms and parameters of a PE fund and then determine parameters that "discretizes" the PE fund into the pool of underlying investment opportunities which a GP selects from. In this way, when an investment decision is made, capital is pro-rata drawn from the fund's LPs (in proportion to their remaining unfunded commitment) and the opportunity enters as a portfolio company. All investment opportunities are simulated with the same dollar value, and the total available capital to the fund is the sum of all LP commitments.

The Risk simulation model 105 may simulate the life cycle of each portfolio company for a non-deterministic period, at which point the GP disposes of the asset using one of several exit strategies (e.g., private-to-private transaction) to predict a cash flow. The terminal/exit value of each portfolio company, grown from the initial investment net of management fees and carry payments, is distributed to LPs. In this framework, the aggregation of all simulated investment actions determines the fund-level LP cash flows.

In one embodiment, the Risk simulation model 105 is configured to generate stochastic variables representing the stochastic (entry and exit) waiting times for each portfolio company. The entry times may exceed the fund's investment period, after which the GP may halt new investment activity (i.e., capital calls cease) and harvesting begins. In those cases, the fund forgoes the opportunity and consequently fails to completely draw undrawn capital available. The Risk simulation model 105 may adopt a hazard-based duration for the stochastic waiting times. For example, the stochastic timing of capital calls is characterized by an intensity process which measures the hazard rate of entry in each time period. Here, an identical capital call intensity is assumed for all investment opportunities. The instantaneous capital call intensity may be interpreted as the portion of undrawn capital to be called during the next time period. In this way, the Risk simulation model 105 may simulate a time-varying structure for these capital call intensities that co-moves with market observables and other factors.

In one embodiment, the Risk simulation model 105 may adopt a similar hazard-based duration to represent the random waiting time until a portfolio company exits is similarly modeled as a hazard-based duration. This intensity is also time-varying and follows a multi-factor structure. The economic linkage captures any procyclical behavior in GP investment decisions.

The Risk simulation model 105 may compute fund-level LP capital calls and distributions by aggregating all underlying portfolio company investment activities. Other fund and LP states can also be depicted. For example, an LP's net cash position ("cash balance") in PE investments can be computed by accruing the distributions net-of capital calls.

In one embodiment, the return to each portfolio company in a PE fund is assumed to follow a linear asset pricing model, e.g., the Fama-French 3-factor and CAPM 1-factor models. Furthermore, each portfolio company within a given fund assumes the same factor exposure profile. The observable net-asset-value (NAV) of a PE fund is computed as an aggregate of all current portfolio company valuations.

The server 130 may use the simulated cash flows to generate various outputs and/or build analytics tools, such as a forecasted cash flow 106 of a PE fund, a quantitative tool for risk management 108 that analyzes the liquidation risk of a PE fund, a multi-asset construction tool 109 for PE investment, and/or the like. In one embodiment, the generated forecasts output 106 and/or other analytics tools 108-109 may be provided to a user device 110, e.g., operated by an investment manager, an institutional investor, and/or the like.

For example, simulated risks associated with a transaction request, such as forecasted cash flow of an illiquid asset class 106 may be transmitted, by the server 130, to cause a display in different visualization formats at a user interface on user device 110. Different visualization interfaces may comprise the forecast cast flow 106, a quantitative tool for risk management 108 and/or multi-asset construction tool 109 built based application running on user device 110. This GUI-based application may facilitate dynamically updating of fund information 102a, economic factor 102b constantly, intermittently and/or on demand. A user operating the user device 110 may then request updated simulation and cash flow forecast analysis in real-time when fund structure and/or economic environment changes. Example GUI diagrams are shown in relation to FIGS. 8-19.

In one embodiment, user device 110 may receive a user input indicating a user decision, or additional information pertaining to make a decision on whether to proceed with the transaction request (e.g., 112a-112n in FIG. 1A). The routing server 130 may evaluate the risk of the transaction request 112a-112n based on the transaction risk (e.g., generated by a quantitative tool for risk management) and make a routing decision to route the transaction request 112a-112n to a destination server.

In this way, routing server 130 is enabled to make a routing decision for incoming network traffic comprising transaction requests 112a-112n based on near real-time simulated risk level (e.g., whether the transaction or network traffic comprises any malicious requests or other high-risk requests). The near real-time simulated risk level is constantly, periodically, intermittently updated according to any change or trigger events from databases 120, 140. In this way, safety and efficiency of an electronic transaction network is improved.

Figure 2:
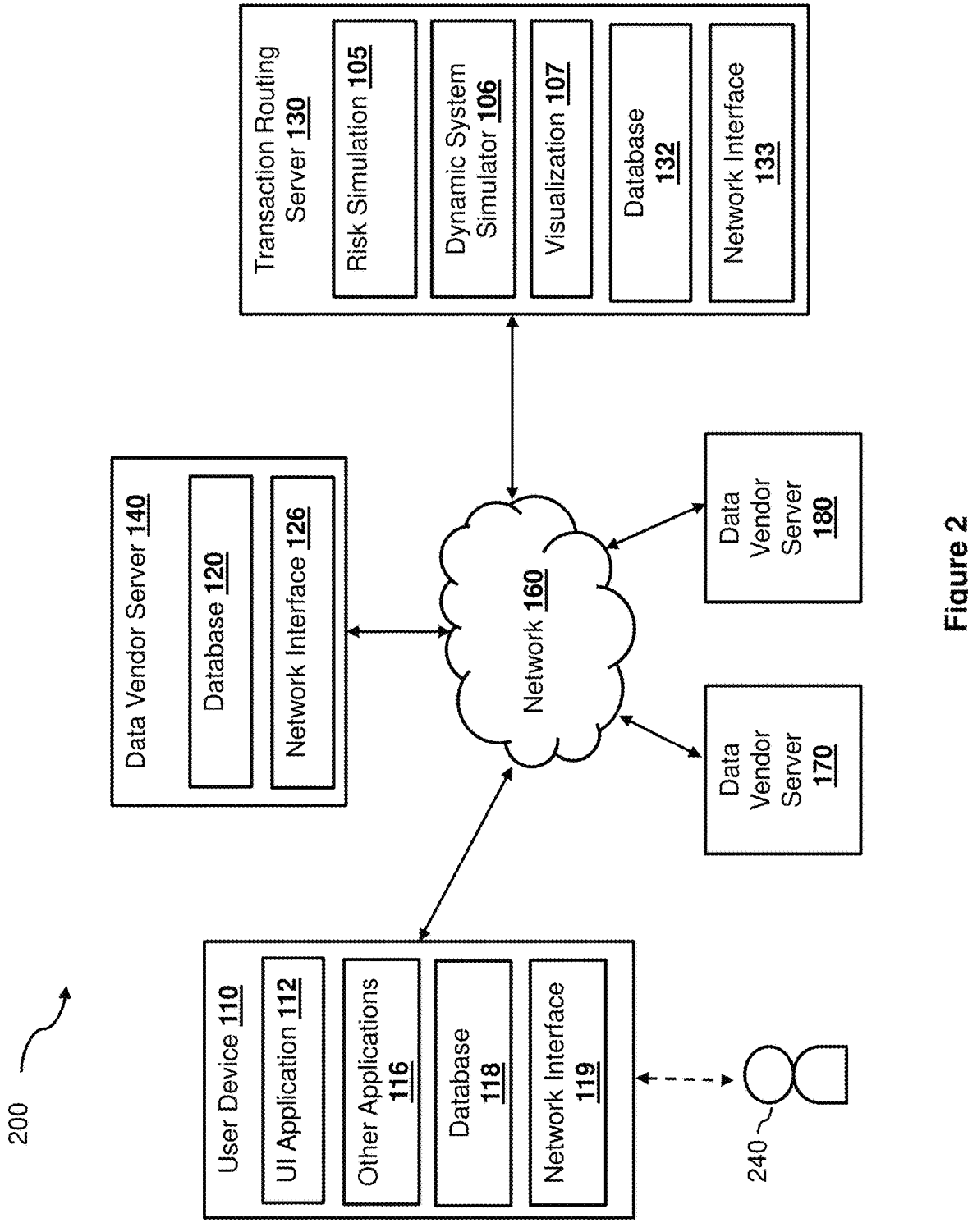
FIG. 2 is a block diagram of a networked system suitable for implementing the PE cash flow simulation framework described in FIG. 1, according to one embodiment described herein.

FIG. 2 is a block diagram 200 of a networked system suitable for implementing the PE cash flow simulation framework described in FIG. 1, according to one embodiment described herein. In one embodiment, block diagram 200 shows a system including the user device 110 which may be operated by one or more users 240, data vendor servers 140, 170 and 180, server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 110, data vendor servers 140, 170 and 180, and the server 130 may communicate with each other over a network 160. The user device 110 may be utilized by user 240 to access the various features available for the user device 110, which may include processes and/or applications associated with the server 130 to receive a forecasted PE cash flow (e.g., 106 in FIG. 1), and/or to implement one or more quantitative tools (e.g., 108-109 in FIG. 1).

User device 110, data vendor server 140, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 140 and/or the server 130. For example, in one embodiment, user device 110 may be implemented as a personal computer (PC), a workstation, a server, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may receive an electronic message containing forecasted cash flow data 106 from the server 130 and display the electronic message via the UI application 112. In other embodiments, user device 110 may include additional or different modules having specialized hardware and/or software as required. For example, UI application 112 may be used to display one or more visualization of simulation outputs 330, e.g., as shown in FIGS. 9-20.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a credit rating report from the server 130. Other applications 116 may include device interfaces and other display modules that may receive input and/or output information. For example, other applications 116 may contain software programs, executable by a processor, including a graphical user interface (GUI) configured to provide an interface to the user.

User device 110 may further include a database 118 stored in a transitory and/or non-transitory memory of user device 110, which may store various applications and data and be utilized during execution of various modules of user device 110. Database 118 may store received forecasted cash flow 106, market data, inflation data, PE fund terms, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 119 adapted to communicate with data vendor server 140 and/or the server 130. In various embodiments, network interface component 119 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts the database 120 or 140 to provide economic data to the server 130. For example, the database 120 may store economic activity or events. The database 120 may be implemented by one or more relational database, distributed databases, cloud databases, and/or the like. In some embodiments, database 120 may be local to data vendor server 140. However, in other embodiments, database 120 may be external to data vendor server 140 and accessible by data vendor server 140, including cloud storage systems and/or databases that are accessible over network 160.

The data vendor server 140 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 140 may send data records retrieved from a database 120, via the network interface 126, to the server 130.

The transaction routing server 130 may be housed with a risk simulation module 105 as described in FIG. 1B, a hardware-based dynamic system simulator 106 and a visualization module 107. In some implementations, the modules 105-107 may include software libraries implemented based on hardware, software, or a combination thereof.

In at least one embodiment, the server 130 may receive various financial data records relating to various fund from various data vendor servers 145, 170 and 180. In at least one embodiment, the server 130 may establish or maintain a pre-established subscription link with each data vendor server 140, 170 and 180, which may in turn provide information of a data server endpoint such as a specific address or URL through which data can be accessed or manipulated to the server 130. In at least one embodiment, the server 130 may automatically load data from data vendor servers 140, 170 and 180 from a specific resource or set of resources exposed by the respective endpoint through an application programming interface (API). For example, the endpoint associated with each data vendor server 140, 170 and 180 may be identified by a unique URL, and it is associated with a particular HTTP method, such as GET, POST, PUT, or DELETE, which determines the action to be performed on the data.

In at least one embodiment, the server 130 may maintain an extract, transform and load (ETL) pipeline to preprocess various financial records loaded from the data vendor servers 140, 170 and 180. For example, raw data may be extracted from the data vendor servers 140, 170, 180 in different formats, such as but not limited to databases (SQL, NoSQL), APIs, flat files (CSV, JSON), third-party systems, cloud storage, and even streaming data. Then raw data is cleaned, standardized, and transformed to match the schema of the target system. For example, currency values may be converted into a consistent currency format, or raw timestamps may be converted into a standard timezone. The transformed data may then be loaded into a target system, such as but not limited to a data warehouse or data lake. The transformed data may be loaded into the target system (e.g., routing server 130) in batches at scheduled intervals, incrementally (e.g., Only loading new or changed data since the last load, reducing data transfer overhead), or in real time (e.g., streaming data continuously into the target system for near real-time processing). For example, transformed sales data may be loaded into a central data warehouse like Amazon Web Service (AWS) Redshift, Snowflake, or Google BigQuery for analysis.

A database 132 may be stored in a transitory and/or non-transitory memory of the server 130. In one implementation, the database 132 may store data records obtained from the data vendor server 140. In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 140, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

Risk Simulation

FIG. 3A provides an example diagram illustrating an example structure of the Risk simulation model 105 described in FIGS. 1-2, according to an embodiment described herein. The Risk simulation model 105 includes a capital call dynamics simulation module 302, a distribution dynamics simulation module 304 and a fund value simulation module 306, all taken data factors from an economies and factor trajectories module 301 that simulates the economic environment and business cycles captured by economic factors. Such economic factors may include S&P 500, PE factors, and/or the like.

For example, the economic simulator 301 may obtain various data factors 102a-102b shown in FIG. 1B, which may be loaded from data vendor servers and converted into numeric vector inputs using the ETL pipeline described in relation to FIG. 2 The capital call dynamics simulation module 302 is configured to use a hazard-based duration process to simulate the pace of capital deployment of a PE fund. For example, a PE fund is assumed to have a total LP commitment of C and be considering N investment opportunities. When one of these N potential deals is executed, C/N capital is called from fund's LPs and deployed. That is, the opportunity enters the fund as a portfolio company. For each candidate portfolio company i, the time of capital deployment is denoted by $$t_{in}^i.$$

If portfolio company i has yet to enter the fund at time t $$\left(\text{i.e. } t_{in}^i > t\right),$$

then on the interval [t, t+Δt] the waiting time is computed as $$\tau_{in}^i = t_{in}^i - t$$

subject to an exponential distribution:

$$f\left(\tau_{in}^i \mid t_{in}^i > t\right) = \lambda_t \exp\left(-\lambda_t \tau_{in}^i\right) \tag{1}$$

where $\lambda_t$ is the hazard rate of entry. The probability of portfolio company i entering the fund within a time Δt after t is:

$$P\left(\tau_{in}^i < \Delta t\right) = 1 - \exp(-\lambda_t \Delta t) \tag{2}$$

If Dt denotes the cumulative capital drawn (called) from the LPs up to time t during the fund's investment period Tc, the module 302 may then compute the undrawn commitment, also known as the fund's "dry powder" as C−D_t. The module 302 may then generate the expected intertemporal cumulative drawdown increment as expected dry powder to be called:

$$E(\Delta D_t) = \left(1 - e^{-\lambda_t \Delta t}\right)(C - D_t) \tag{3}$$

Here, the instantaneous hazard rate $\lambda_t$ measures capital call intensity. Notice that with a larger λt: the more likely the GP is to invest in a candidate portfolio company, the shorter waiting time is and therefore the higher the drawdown rate is. Here $\lambda_t$ is time-varying over the investment period, which can more accurately depict the actual capital call process than a constant intensity value, because drawdown intensities have observed relationships with the general economic environment, business cycle and the cost of borrowing. These effects from the general economic environment are expressed through a family of systematic factors F_t which may be obtained from the economic simulation trajectory module 301. The addition of a time term captures any acceleration of dry powder deployment as the fund approaches the end of its investment period. The drawdown intensity is therefore assumed to have a factor-driven autoregressive structure with Gaussian noise $$\lambda_{t+\Delta t} = \alpha_\lambda + \gamma_\lambda t + \phi_\lambda \lambda_\lambda + B_\lambda' F_t + \sigma_\lambda \sqrt{\Delta t}\, \epsilon_t^\lambda \tag{4}$$

The distribution dynamics simulation module 304 may simulate the exist process when the investor exists the portfolio company. For example, once a portfolio company enters the fund there is an a priori uncertain holding period before the GP divests from the position. Let $$t_{out}^i$$

be the random variable demarking portfolio company i's time of exit. The module 304 may then compute the waiting time until exit as $$\tau_{out}^i = t_{out}^i - t$$

which follows an exponential distribution on the interval [t, t+Δt]

$$f(\tau_{out}^i \mid t_{out}^i > t) = \eta_t \exp(-\eta_t \tau_{out}^i) \tag{5}$$

The probability of portfolio company i exiting the fund within time Δt after t is the computed as:

$$P(\tau_{out}^i < \Delta t) = 1 - \exp(-\eta_t \Delta t) \tag{6}$$

In one embodiment, the module 304 may adopt several exit strategies a GP may choose during the harvest period to initiate a divesture (e.g., private-to-private secondary transaction). The module 304 may assume each LP receive the terminal/exit value, grown from an initial investment of C/N, net of management fees and carry payments1. If Rt is written for the cumulative LP distribution and Vt for the fund value. The exit probabilities are assumed identical for all remaining portfolio companies. Thus, the expected fund-level distribution is the current fund value adjusted by the probability of exit:

$$E(\Delta R_t) = (1 - e^{-\eta_t \Delta t})V_t + V_T 1_{\{t=T\}} \tag{7}$$

The second term of this equation embeds an assumption of full liquidation by the end of the fund's total modeled life. The instantaneous hazard rate $\eta_t$ measures the distribution intensity. As $\eta_t$ grows, so does both the likelihood of portfolio company harvest and the rate of capital distributions. Correlations have been observed between business cycles and $\eta_t$. Thus, the module 304 may simulate the intensity of distributions having a factor-driven autoregressive structure with Gaussian noise as:

$$\eta_{t+\Delta t} = \alpha_\eta + \gamma_\eta t + \phi_\eta \eta_t + B'_\eta F_t + \sigma_\eta \sqrt{\Delta t}\, \epsilon_t^\eta \tag{8}$$

In one embodiment, the capital call intensity and distribution intensity shown in equations (4) and (8) may be estimated using panel regression. The capital call intensity of fund k is approximated from Equation (3) as the drawn fraction of unfunded commitment:

$$\lambda_{k,t} := -\frac{1}{\Delta t} \log\left(1 - \frac{D_{k,t} - D_{k,t-\Delta t}}{C_{k,0} - D_{k,t-\Delta t}}\right) \tag{9}$$

The distribution intensity of fund k is approximated as the distributed fraction of fund value which is derived from Equation (7) as $$\eta_{k,t} := -\frac{1}{\Delta t} \log\left(1 - \frac{R_{k,t} - R_{k,t-\Delta t}}{NAV_{k,t-\Delta t}}\right) \tag{10}$$

In both regressions, the independent variables include a time effect, risk-free rate and an excess market return $$\lambda_{k,t} = \alpha_\lambda + \phi_\lambda \lambda_{k,t-\Delta t} + \gamma_\lambda t + \beta_f^\lambda r_{f,t} + \beta_M^\lambda (r_{m,t} - r_{f,t}) + u_k^\lambda + \sigma_\lambda \sqrt{\Delta t}\, \epsilon_{k,t}^\lambda \tag{11}$$

$$\eta_{k,t} = \alpha_\eta + \phi_\eta \eta_{k,t-\Delta t} + \gamma_\eta t + \beta_f^\eta r_{f,t} + \beta_M^\eta (r_{m,t} - r_{f,t}) + u_k^\eta + \sigma_\eta \sqrt{\Delta t}\, \epsilon_{k,t}^\eta \tag{12}$$

The fund fixed effects in the panel data and the error covariances are clustered. To avoid extreme outliers, the terminal outflow may be ignored.

In one embodiment, the return model may also be calibrated via a regression model. ΔDt is the cumulative capital called at t, and ΔRt is the cumulative distribution. Define $PV_{Dis}$ and $PV_{Inv}$ as:

$$PV_{Dis} = \sum_{t=1}^{T_l} \frac{\Delta R_t}{\prod_{s=0}^{t} (1 + \alpha + r_{f,s} + \beta' F_s)} \tag{13}$$

$$PV_{Inv} = \sum_{t=1}^{T_l} \frac{\Delta D_t}{\prod_{s=0}^{t} (1 + \alpha + r_{f,s} + \beta' F_s)} \tag{14}$$

For each fund, the logarithm of the ratio $PV_{Dis}/PV_{Inv}$ is subject to a normal distribution:

$$\ln PME \equiv \ln \frac{PV_{Dis}}{PV_{Inv}} \sim N(-0.5\sigma^2, \sigma^2) \tag{15}$$

in which the unknown parameters (α, β, σ) are estimated using an expectation maximization algorithm.

The fund value dynamics simulation module 306 may simulate the fund value dynamics, e.g., based on the cumulative capital drawn $D_t$ from the capital call dynamics simulation module 302 and the cumulative distribution $R_t$ obtained from the distribution dynamics simulation module 304. For example, the observed net-asset-value of a PE fund is an aggregate of the individual underlying portfolio company valuations. At time t, the module 306 may compute changes in fund value resulting from both the evolution of portfolio company valuations and net fund cash flows:

$$\Delta V_t = \sum_{\{i \mid t_{in}^i < t < t_{out}^i\}} \Delta V_t^i + \Delta D_t - \Delta R_t \tag{16}$$

In most cases, both public and private firms are exposed to the same fundamental economic drivers. The evolution of portfolio company i's valuation is defined as:

$$\frac{\Delta v_t^i}{v_t^i} = \alpha + r_f + \beta' F_t + \sigma_V \epsilon_t^i \tag{17}$$

Here, the factor structure Ft could be chosen as CAPM, Fama-French or any number of other asset pricing models.

Therefore, the LP's cash balance Ct decreases as capital is called and increases as capital is distributed. Assuming the cash account reinvests with rate of return rc, cash balance dynamics can be computed as:

$$\Delta C_t = r_c \Delta t + \Delta R_t - \Delta D_t \tag{18}$$

In another embodiment, following the methodology to add randomness to the Takahashi-Alexander model, the Risk simulation model 105 may simulate the call and distribution rates in an alternative way, e.g., the call and distribution rates are formulated as a censored distribution as described below.

In one embodiment, the capital call dynamics simulator 302, economy trajectories simulator 301, distribution dynamics simulator 304 and fund value dynamics simulator 306 may be built on a hardware stochastic simulator as described in FIG. 10.

FIG. 3B provide an example PE cash flow model simulation process 300, according to one or more embodiments described herein. In one embodiment, an input preprocessing module 310 may receive fund data records 312 in various formats, and data relating to pre-canned scenarios for stress testing 313, and convert such data into data variables for simulation 320. For example, these fund financial data records may be received from one or more remote databases, such as from data vendors 140, 170, 180 described in FIG. 2.

In one embodiment, fund data records 312 may include, but not limited to, market factors (e.g., market indices obtained from a publicly trade exchange, etc.), user account information (e.g., including information relating to the current holdings of different assets of an investor, fund account date, etc.), prior call/distribution (e.g., user prior call/distribution history prior to the current time t, etc.), fund constituents, and other third party factors (such as market trends, analytics report, call/distribution history of other investors, and/or the like). The fund data records may be received in various different formats. For example, the market factor may be obtained in the form of one or more spreadsheets via the Bloomberg Data API, Thomson Reuters Data API, and/or the like. For another example, fund constituent information may be obtained in the form of fund financial statements containing numeric values and non-numeric values.

In one embodiment, the various fund financial data records of different formats may be transformed into time series data representing call and/or distribution events comprising a call or distribution amount associated with a time instance. Such time series call data may be stored at database 132, for statistical analysis to compute call or distribution parameters. Example parameter estimation may be discussed in relation to FIG. 3C.

For another example, attributes of different fund statements may be extracted, and thus fund data may be clustered into cohorts defined by their attributes, such as strategy, buyout, venture capital, real estate, private credit, natural resources, infrastructure, and/or the like. In one embodiment, the process of input preprocessing 310 may be performed at an ETL pipeline as described in FIG. 2.

For each cohort, a simulation 320 may be performed to simulate its dynamics of capital calls and distribution. Simulation 320 may be performed by hardware-based stochastic simulators 1033 as described in FIG. 10.

In one embodiment, the dynamics of a capital call and/or a distribution may be characterized by a random capital call rate and/or distribution rate. An uncensored latent variable $\lambda$ is the sum of a systematic factor f that is shared across funds, and an idiosyncratic component $\eta$. The following expressions describe this structure, with censoring on the left and the sum of systematic and idiosyncratic components on the right:

$$RC_{i,a} = \min\{\max\{\lambda_{i,a}^C, 0\}, 1\}, \quad \lambda_{i,a}^C = f_{v_i+a}^C + \eta_{i,a}^C, \tag{19}$$

$$RD_{i,a} = \min\{\max\{\lambda_{i,a}^D, 0\}, 1\}, \quad \lambda_{i,a}^D = f_{v_i+a}^D + \eta_{i,a}^D,$$

where $v_i$ is the vintage of fund i, such that $t=v_i+a$ is the clock time. The descriptions for calls and distributions are structurally the same, but with each their own systematic factor f that does not depend in the fund i. The above equations describe call and distribution rates as function of the fund age but are coupled through this common factor $f^c$.

In one embodiment, the choice of common factor $$f_t^C$$

may be flexible. For example, an autoregressive process with Gaussian noise may be employed to capture the persistence in the capital calls:

$$f_t^C = \phi_C f_{t-1}^C + \varepsilon_t^C, \varepsilon_t^C \sim \mathcal{N}(o, \sigma_\chi^C) \tag{20}$$

In one embodiment, the idiosyncratic components may be formulated using a heavy-tailed distribution. The means and variances are also strongly dependent on the age of the fund, e.g., $$\eta_{i,a}^C \sim t_2(\mu_a^C, \sigma_a^C), \eta_{i,a}^D \sim t_1(\mu_a^D, \sigma_a^D), \tag{20}$$

where $t_v(\mu, \sigma)=\mu+\sigma t_v$ with $t_v$ a Student-T distribution with v degrees of freedom. Therefore, the full non-linear state space model for the capital call rate (and therefore for the capital call) is:

$$C_{i,a} = RC_{i,a}\left(1 - \sum_{\tau=0}^{a-1} C_{i,\tau}\right), \tag{21}$$

$$RC_{i,a} = \min\{\max\{f_t^C + \eta_{i,a}^C, 0\}, 1\}, \quad \eta_{i,a}^C \sim t_{v^C}(\mu_a^C, \sigma_a^C), \quad i \in \mathcal{I}_t,$$

$$f_t^C = \phi_C f_{t-1}^C + \varepsilon_t^C, \quad \varepsilon_t^C \sim \mathcal{N}(0, \sigma_f^C).$$

where a is the fund's age, $v_i$ is the fund's vintage, and t=a+vi is the clock time. The measurement equations above specify how the observations are related to the latent systematic factor $$f_t^C$$

and the state equation (20) describes the evolution of the latent factor. The number of observations (and thus the number of measurement equations) available at each time is not constant. The set $I_t$ denotes the set of active funds at time t. If $L_i$ is the lifetime of fund i, then $$I_t = \{i \mid v_i \le t < v_i + \min\{L_i, 60\}\}$$

i.e. a fund is active at time t if its vintage is in the past and its lifetime has not ended. The $L_i$ is capped at a number (e.g., 60-80, etc.) quarters to exclude the call and distribution rates of very old funds. By definition $0 \le a < 60$ such that $$\mu_a^C$$

and $$\sigma_a^C$$

are defined on the first 60 quarters, i.e. 15 years.

In one embodiment, distribution rates may be structurally similarly as the call rates, but with its own systematic factor $$f_t^D$$

which is common for funds within the same asset class, and the idiosyncratic component $$\eta_a^D (\text{e.g.,}\ \eta_{i,t-v_i}^D),$$

which depends on fund i and fund age a. The degrees of freedom of the Student-T distribution $tv^D$ can be different from $tv^C$ to capture different tail behavior of distributions and capital calls. The full non-linear state space model for the distribution rate (and therefore for the distribution) is:

$$D_{i,a} = RD_{i,a} \times V_{i,a-1} \times (1 - RG_{i,a}), \qquad (22)$$

$$RD_{i,a} = \min\{\max\{f_t^D + \eta_{i,a}^D, 0\}, 1\}, \quad \eta_{i,a}^D \sim t_{v,D}(\mu_a^D, \sigma_a^D), \quad i \in I_t,$$

$$f_t^D = \phi_D f_{t-1}^D + \varepsilon_t^D, \qquad \varepsilon_t^D \sim N(0, \sigma_f^D).$$

In one embodiment, the systematic drivers are modeled jointly with growth rates. The growth rates themselves follow a log-normal distribution based on a factor model, i.e., $$\log(1 + RG_{i,a}) = X_i^T f_g^G + \eta_{i,a}^G, \ \eta_{i,a}^G \sim N(\mu_i^G, \sigma_i^G). \qquad (23)$$

The growth factors $$f_t^G$$

and the exposure $X_i$ are taken directly from a risk model. Unlike for calls and distributions, the idiosyncratic mean and volatility depends on the fund i and not age a. That is, they are constant during a fund's lifetime, but vary fund-by-fund even within the same private asset class. The dynamics of fund value may thus be computed as:

$$V_{i,a} = V_{i,a-1} \times (1 - RG_a) + C_{i,a} - D_{i,a}, \qquad V_{i,0} = 0, \qquad (24)$$

$$\log(1 + RG_{i,a}) = X_i^T f_g^G + \eta_{i,a}^G, \qquad \eta_{i,a}^G \sim N(\mu_i^G, \sigma_i^G).$$

Therefore, the joint dynamics of the systematic factors including the capital call latent factor 321, and distribution latent factor 322, e.g., $$(f_t^C, f_t^D, f_t^G)$$

may be jointly simulated by Janus ESS Economies & Factor Trajectory Simulator 301 shown in FIG. 3A. Within the simulator 301, the systemic factors driving calls and distributions are modeled according to Eq. (21) and (22) with correlated shocks, whereas the fund return process 323 is in turn simulated according to Eq. (24).

In one embodiment, simulation outputs including projected capital calls 331, projected distribution 332 and/or projected NAV 333 may be visualized via an interactive user interface. For example, example visualization of simulation outputs 330 may be illustrated in FIGS. 9-20.

FIG. 3C provides an example logic flow illustrating an example model estimation process for the randomized Risk simulation model 105, according to one embodiment described herein. One or more of the processes of process 300 may be implemented, at least in part, in the form of executable code stored on non-transitory, tangible, machine-readable media that when run by one or more processors may cause the one or more processors to perform one or more of the processes. In some embodiments, process 300 may be performed by the server 130 implementing the Risk simulation model 105 in FIGS. 1-2. It is worth noting that additional processes, steps and/or implementations may be omitted, performed in a different sequence, or combined as desired or appropriate.

Specifically, for a randomized model for call and/or distribution as described in Eq. (19)-(24), NAVs reported from past fund records that are inconsistent with the Taka-hashi-Alexander model dynamic equations are deleted and an imputation model is used to fill out likely NAVs at step 340. For example, the imputation model may implement Monte-Carlo simulation based on historical call and/or distribution events to derive a missing NAV value and/or a NAV value that is deemed inconsistent. This is necessary because NAV reporting may be sporadic, highly subjective, error-prone, and can imply highly unrealistic growth rates. Calls and distributions are more reliable and only subject to basic data cleaning. With consistent values of calls, distributions and NAVs in place, the call, distribution and growth rates can be computed for every fund in the dataset.

In one embodiment, after cleaning inconsistent NAV values, missing NAVs may be imputed on a fund-by-fund basis using historical call rates and historical distribution rates to replace the at least portion of received history net asset. For fund i, the set of imputed NAVs are generated using the growth rate according to a log-normal centered around a benchmark

23

$$f_t^B,$$

$$\log(1 + RG_{i,t-v_i}) = \log\left(\frac{V_{i,t-v_i} - C_{i,t-v_i} + D_{i,t-v_i}}{V_{i,t-v_i-1}}\right) \sim \mathcal{N}(\log(1 + f_t^B) \cdot \sigma^G).$$

Second, all parameters related to calls, e.g., mean location factor $$\mu_\alpha^C$$

and scale factor $$\sigma_\alpha^C$$

for Student-T distribution of call distribution in Eq. (20), are estimated based on the historical call rates at step 350. For example, the various fund financial data records of different formats may be parsed and transformed into time series data representing call events comprising a call amount associated with a time instance. Such time series call data may be stored at database 132, for statistical analysis to compute call parameters such as mean location factor $$\mu_\alpha^C$$

and scale factor $$\sigma_\alpha^C$$

for Student-T distribution of call events in Eq. (20). The random call rate according to a first student-T distribution having a first degree of freedom based on the set of call-related parameters may be generated.

In one embodiment, a set of call-related parameters including a first systematic factor for a random call rate, a first location parameter and a first scale parameter may be generated, via a non-linear state space model, according to Eq. (21), which uses the set of call-related parameters as time-varying variables of the non-linear state space model that runs for a plurality of time instances.

Third, all parameters related to distributions are similarly estimated based on the historical distribution rates at step 360, e.g., means $$\mu_\alpha^D$$

and variances $$\sigma_\alpha^D$$

24 for Student-T distribution of distribution events in Eq. (20). The random distribution rate according to a second student-T distribution having a second degree of freedom based on the set of distribution-related parameters and, e.g., according to Eq. (22).

In one implementation, call parameters estimation 350 and distribution parameter estimation 360 may be performed concurrently, alternately, optionally and/or in any different order.

At step 370, growth parameters may be similarly estimated based on the historical distribution rates at steps 350-360 e.g., location factor $$\mu_i^G$$

and scale factor $$\sigma_i^G$$

for the Gaussian distribution in Eq. (23). In some implementations, growth parameters may be retrieved from a memory that stores previously estimated growth parameters.

In another example, systematic factors such as $$f_t^C$$

may be generated, e.g., via stochastic variational inference, from historical time-series data of call and distribution events. Example estimated time-series data of systematic factors may be illustrated in FIGS. 14-15.

In one embodiment, for example, additional model parameters with estimation procedure for a single asset class may be found below:

| Parameter | Description | Estimation strategy |
|---|---|---|
| $C_{i,a}$ | Call of fund i at age a | Observed |
| $D_{i,a}$ | Distribution of fund i at age a | Observed |
| $V_{i,a}$ | NAV of fund i at age a | Observed with imputation if missing |
| $RC_{i,a}$ | Capital call rate | Derived from $C_{i,a}$ |
| $RD_{i,a}$ | Distribution rate | Derived from $C_{i,a}$ ,$D_{i,a}$, and $V_{i,a}$ |
| $RG_{i,a}$ | Growth rate (of NAV) | Derived from $C_{i,a}$, $D_{i,a}$, and $V_{i,a}$ |
| $f_t^C$ | Systematic factor for $RC_{i,a}$ | SVI based on $RC_{i,a}$ |
| $\mu_a^C$ | Location parameter for $\eta_{i,a}{}^C$ | SVI based on $RC_{i,a}$ |
| $\sigma_a^C$ | Scale parameter for $\eta_{i,a}{}^C$ | SVI based on $RC_{i,a}$ |
| $f_t^D$ | Systematic factor for $RD_{i,a}$ | SVI based on $RD_{i,a}$ |
| $\mu_a^D$ | Location parameter for $\eta_{i,a}{}^D$ | SVI based on $RD_{i,a}$ |
| $\sigma_a^D$ | Scale parameter for $\eta_{i,a}{}^D$ | SVI based on $RD_{i,a}$ |
| $f_t^G$ | Systematic factors for $RG_{i,a}$ | Aladdin-based |

-continued

| Parameter | Description | Estimation strategy |
|-----------|-------------|---------------------|
| $\mu_i^G$ | Mean of log-returns on NAV | JANUS-provided |
| $\sigma_i^G$ | Volatility of log-returns on NAV | Aladdin-based |

In one embodiment, at step 380, Monte-Carlo simulation using ESS simulator 301 may be used to generate a family of projected fund cash flow and value paths. The simulation may generate capital call dynamics or distribution dynamics of the private equity investment vehicle using the random call rate or the random distribution rate, respectively. For example, the latent systematic factors and the growth rate are jointly simulated by the ESS engine 301. Through the ESS engine, those factors are modeled as part of the ESS Universal Simulator and are linked economic variables and thus allows for stress testing and scenario analysis at 313.

Specifically the fund's capital call rate and distribution rate may be simulated according to Eq. (19). Using estimated parameters such as means $$\mu_\alpha^C \mu_\alpha^D$$

and variances $$\sigma_\alpha^C \sigma_\alpha^D$$

for Student-T distribution, a student T distribution may be defined.

In one embodiment, the ESS simulator 301 that is running on one or more hardware processors may then use a random number generator to create a large number of random samples (e.g., 10,000 samples, etc.) according to the defined student T distributions representing samples of a call rate variable or a distribution rate variable according to Eq. (19). In one embodiment, the ESS simulator 301 may be implemented on the hardware simulator 833 shown in FIG. 8.

For example, in one implementation, the random number generator may first generate uniformly distributed random numbers between 0 and 1, which may be performed by a hardware random number generator that uses a physical process such as but not limited to electronic noise or radioactive decay to create the randomness, and/or the like. For another example, the random number may be generated based on operating system entropy sources, collected from various hardware events and user interaction; and such entropy sources may be accessed by a system API at server 130 in FIGS. 1-2.

In one embodiment, the generated uniformly distributed random numbers may then be transformed into random numbers following a particular probability distribution, e.g., student T distribution based on a cumulative distribution function (CDF) computed using the estimated parameters such as location factors $$\mu_\alpha^C \mu_\alpha^D$$

and scale factors $$\sigma_\alpha^C \sigma_\alpha^D.$$

Similarly, other variables may be simulated using the random number generator according to a defined probability distribution such as student T distribution, Gaussian distribution defined by the estimated parameters. Based on the simulation, a trajectory of simulated net asset value may thus be computed, e.g., according to Eq. (24).

In one embodiment, realizations of fund capital call, distribution and fund values may then be computed from the simulated paths, according to Eq. (21), (22) and (24). From simulation outputs, a valuation outcome may be provided from the private equity investment vehicle, e.g., via a UI interface as shown in FIGS. 8-19.

It is to be noted that while some embodiments of FIGS. 3A-3C relate to simulating call and/or distribution dynamics associated with a transaction request of illiquid assets, the hardware-based simulator may be applied to simulating different types of requests associated with network resource access requests. For example, each call event may represent a start of a network application session such as a video streaming session, and each distribution event may represent an end of the video streaming session. The call dynamics, distribution dynamics, and cash flow dynamics may thus each represent a demand for network resource (such as bandwidth) by a type of network traffic (e.g., streaming, electronic mail, voice over IP, and/or the like), the released network resource, and the remaining available network resource at a network system.

The routing server may then use the simulation process described in FIGS. 3A-3C to simulate future resource demands, and risks associated with a network resource access request in the incoming traffic, e.g., whether demanded further network resource would exceed available bandwidth for the particular type of network traffic, to route such network resource access request to its destination server, and allocate network resource accordingly. In this way, routing technology thus improves the overall utility performance of the network.

FIG. 4 provides an example logic flow diagram illustrating an example simulation process 400 performed by the Risk simulation model 105, according to one embodiment described herein. One or more of the processes of process 400 may be implemented, at least in part, in the form of executable code stored on non-transitory, tangible, machine-readable media that when run by one or more processors may cause the one or more processors to perform one or more of the processes. In some embodiments, process 400 may be performed by the server 130 implementing the Risk simulation model 105 in FIGS. 1-2. It is worth noting that additional processes, steps and/or implementations may be omitted, performed in a different sequence, or combined as desired or appropriate.

In one embodiment, the PE cash model 105 may conduct Monte-Carlo simulation to generate a family of projected PE fund cash flow and value paths which can be used to analyze tail behavior. At step 402, information relating to a private equity investment vehicle including a plurality of vehicle attributes may be received via a communication interface. In one implementation, fund attributes and terms may be received across each set of trials including the strategy of the fund (buyout (BO) or venture capital (VC)), the total fund life $T_l$, the investment period length $T_c$ and the total commitment C. For example, a $T_c$ of 8 years and a $T_l$ of 12 years may be set. This is based on a calibration sample where after 12 years more than 90% of funds (both BO and VC) have terminated all net flow activity.

In one implementation, state variables are initialized across all trials including: the cumulative capital called to-date $D_0$, the cumulative distributions paid out to-date R0, the current LP cash balance C0, the fund's present net asset value V0 and the starting capital drawdown and distribution velocities $\lambda 0$ and $\eta 0$. This example initializes at t=0 (i.e. V0=0, D0=0, R0=0, C0=C).

At step 404, the private equity investment vehicle may be decomposed into a set of discrete portfolio investment opportunities, each of which is subject to a respective stochastic entry time and a respective stochastic exit time in and out of the private equity investment vehicle, respectively.

At step 406, the PE cash flow model may calibrate, using a regression model, one or more capital call intensity parameters or distribution intensity parameters including a lagged intensity value, an age of the private equity investment vehicle, and a risk-free rate and a market return based on historical capital call intensity data or historical distribution intensity data. For example, each intensity variable is regressed on its lagged value, the age of the fund, the risk-free rate and the market return. The regression includes fund fixed effects and standard errors clustered at the fund level. To avoid extreme outliers, the terminal outflow is dropped.

In one embodiment, a two-pass factor selection is performed on the candidate variables, only retaining those that exhibit significance greater than 10% in the first pass. FIGS. 7A-7B summarize the calibration results for BO and VC. Panels A and B record the results of the parameter calibration for capital calls and distributions respectively. The "Full" column records the 1st pass results, while the 2nd pass "Selected" column is the input to the example simulation.

The annualized average capital call intensities indicate that LPs expect approximately 37%-38% of their unfunded commitments to be called in any given year, consistent with the typical fund's 2-5-year investment period. The average distribution intensities (as an annual probability of exit) are consistent with the stylized fact that median first-round VC investments have an expected holding period of 5 years, while BO investments observe average holding periods of 4 years.

The capital call and distribution intensities both have a significant fund-lifecycle relationship. After the end of a fund's investment period, management fees often transition to a percentage of the total capital deployed—a potential incentive for GPs to "burn money" on bad deals as this date approaches. Towards the end of a fund's life there is a natural increase in the pace of harvest. Five years from initiation, both BO and VC funds increase their call intensity by approximately 0.2, and their distribution intensity by 0.1. Variation in the risk-free rate, as a proxy for the monetary policy environment, significantly boost the capital call and distribution intensities of both BO and VC. That is, a higher risk-free rate yields a higher elasticity of intertemporal substitution. As a result, investment activities in both private and public markets increase, while transaction frictions fall.

On average, the market return does not significantly influence BO capital call and distribution intensities. For a VC fund however, a 10% rise in the market return will boost capital call intensity by about 0.01, and distribution intensity by about 0.008. Market returns potentially affect a GP's investment decisions in two ways: a bull market pro-cyclically boosts capital distributions, while a fall in asset prices drives value investing.

Capital call intensities exhibit increased persistence over distributions. The capital call autoregressive coefficients are 0.58 (BO) and 0.54 (VC); while BO distributions are 0.14 and insignificant for VC. The example's 2nd pass parsimonious selection of factors explains 30% (BO) and 27% (VC) of the capital call variation, while explaining 16% (BO) and 14% (VC) of the distribution variation. As a result, capital call dynamics are calibrated with an idiosyncratic volatility of 0.31 (BO) and 0.40 (VC), and distributions as 0.41 (BO) and 0.20 (VC).

To model return paths for a fund's underlying portfolio companies, and therefore the fund's NAV, portfolio company parametric returns are used as the discount rate-a public market equivalent (PME) assumption. Likelihood maximization fits the return factor model to observed PE fund cash-flow data. FIG. 7C records the calibration results for both a one-factor (market portfolio) model, and a three-factor model incorporating Fama-French size and value factors. The bootstrapped standard error is recorded in parenthesis. The size and value factors are not significant at 5% level for either BO or VC. Thus, the simulation proceeds with the one factor model.

Referring to step 408 in FIG. 4, the PE cash flow model may conduct a simulation of capital call dynamics or distribution dynamics of the set of discrete portfolio investment opportunities, by simulating a capital call intensity rate or a distribution intensity rate according to a hazard rate model, based on the plurality of vehicle attributes. Detailed simulation process 408 may be further described in relation to FIG. 5.

At step 410, the PE cash flow model may generate, from simulation outputs, a forecasted cash flow from the private equity investment vehicle.

FIG. 5 provides an example logic flow diagram illustrating an example process 408 of conduct a simulation of capital call dynamics or distribution dynamics of the set of discrete portfolio investment opportunities, according to one embodiment described herein. One or more of the processes of process 408 may be implemented, at least in part, in the form of executable code stored on non-transitory, tangible, machine-readable media that when run by one or more processors may cause the one or more processors to perform one or more of the processes. In some embodiments, process 408 may be performed by the server 130 implementing the Risk simulation model 105 in FIGS. 1-2. It is worth noting that additional processes, steps and/or implementations may be omitted, performed in a different sequence, or combined as desired or appropriate.

At step 502, a set of economic factors that drive capital calls, distributions or returns of the set of discrete portfolio investment opportunities are obtained. In one implementation, the economic factors may include a common family of systematic economic factors Ft that drive the intensity of capital calls, distributions and the investment return. For example, the MSCI US Index may be used as a market portfolio and the 3-month Treasury as a risk-free rate. The factors are assumed to follow a normal distribution with unconditional mean and covariance matrix set.

At step 504, the simulated capital call intensity rate or the simulated distribution intensity rate may be generated based on the set of economic factors. For example, the Risk simulation model 105 may simulate the fund-level capital call intensity $\lambda t$ and distribution intensity $\eta t$, according to their exposures to the factors in Step 502. The positive part of $\lambda t$ and $\eta t$ may be filtered to avoid divergent intensities.

At step 506, simulated returns may be generated from the set of discrete portfolio investment opportunities by drawing the set of discrete portfolio investment opportunities from a Gaussian distribution. For example, the total number of possible portfolio companies may be drawn from the distribution $N \sim N(\mu_N, \sigma_N^2)$, where the mean and standard error are based on the fund's attributes. The population cohorts are "uninvested", "invested but not liquidated" and "liquidated" in proportion with the initial conditions. The number of portfolio companies in a fund sets the level of capital discretization. For example, the median number of underlying investments across the BO fund universe may be set as 12, with an interquartile range of 9.75-16.67; while the median number of underlying assets across the VC fund universe is 20, with an interquartile range of 15-30. The median may be set as the mean and calibrate standard errors based on these interquartile ranges.

Figure 6:
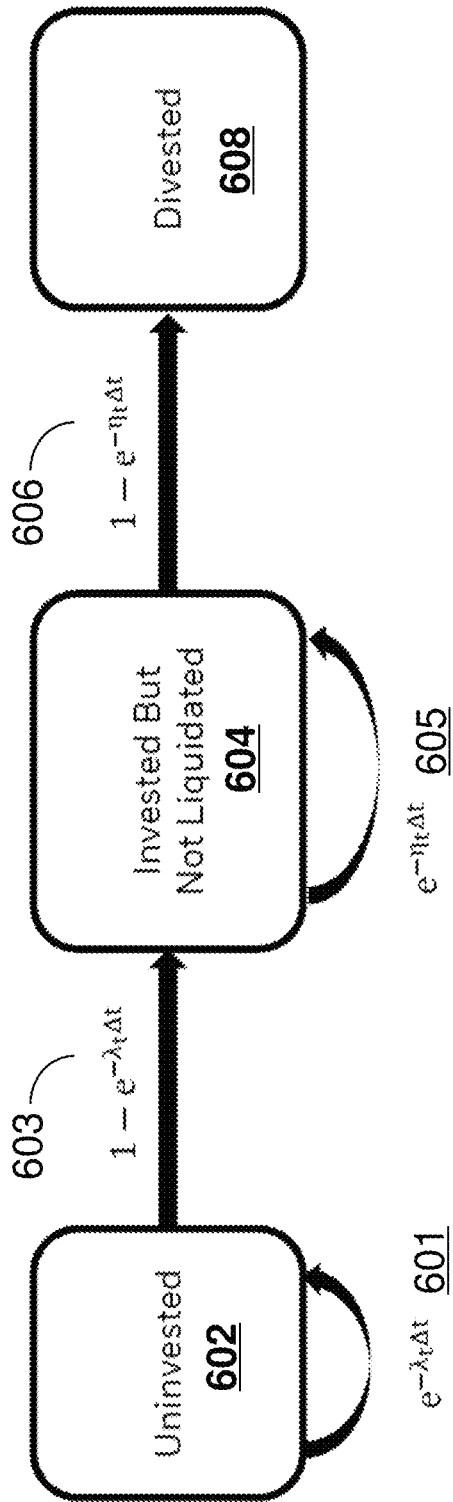
FIG. 6 provides an example block diagram illustrating the conditional transition probabilities between investment states, according to one embodiment described herein.

At step 508, a simulated entry time and a simulated exit time may be generated for each discrete portfolio investment opportunity based on transition probabilities computed from the simulated capital call intensity rate and the simulated distribution intensity rate. The Risk simulation model 105 may simulate the investment timing of each portfolio company by sequentially simulating the investment states. FIG. 6 provides an example block diagram illustrating the conditional transition probabilities between investment states. An investment opportunity may enter the fund (transitions from "uninvested" 602 to "invested but not liquidated" 604) with a probability of $1-e-\lambda t\Delta t$ at 603. Or the investment opportunity may remain at "uninvested" 602 with a probability of $e-\lambda t\Delta t$ at 601. Similarly, a portfolio company may exit this period (transitions from "invested but not liquidated" 604 to "divested" 608) with a probability $1-e-\eta t\Delta t$ at 606, or remains invested at 605 with a probability $e-\eta t\Delta t$ at 605.

Specifically, each uninvested opportunity's fraction of initial commitment C/N is warehoused in the LP's cash balance—transferring to the fund's value when called. Once a portfolio company enters the fund, its valuation evolves according to the company's (fund's) simulated factor-based returns. The portfolio company's net liquidation value at divestment is recorded in the LP's cumulative distributions and returned to the cash balance.

At step 510, simulated activities of the set of discrete portfolio investment opportunities may be aggregated to obtain a capital drawdown, a distribution and a return value at fund-level for the private equity investment vehicle.

At step 512, a distribution of state variable trajectory may be generated corresponding to investment states of the set of discrete portfolio investment opportunities. For example, the state variable trajectories may be generated using 100,000 trials and tail analytics estimated.

It is to be noted that while some embodiments of FIGS. 4-5 relate to simulating call and/or distribution dynamics associated with a transaction request of illiquid assets, the hardware-based simulator may be applied to simulating different types of requests associated with network resource access requests. For example, each call event may represent a start of a network application session such as a video streaming session, and each distribution event may represent an end of the video streaming session. The call dynamics, distribution dynamics, and cash flow dynamics may thus each represent a demand for network resource (such as bandwidth) by a type of network traffic (e.g., streaming, electronic mail, voice over IP, and/or the like), the released network resource, and the remaining available network resource at a network system.

The routing server may then use the simulation process described in FIGS. 4-5 to simulate future resource demands, and risks associated with a network resource access request in the incoming traffic, e.g., whether demanded further network resource would exceed available bandwidth for the particular type of network traffic, to route such network resource access request to its destination server, and allocate network resource accordingly. In this way, routing technology thus improves the overall utility performance of the network.

Hardware Implementation of Risk-Simulation Based Routing

Figure 8:
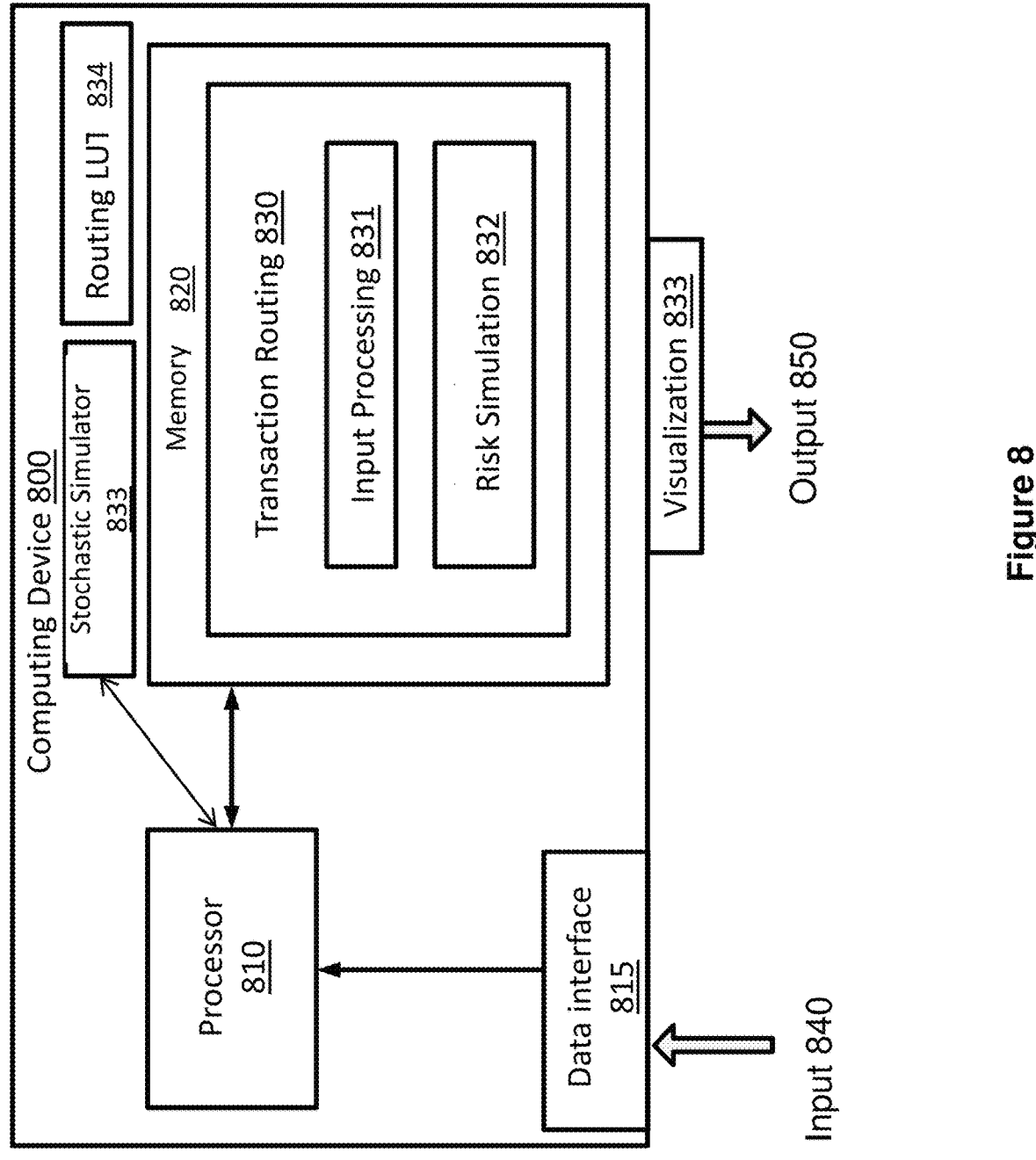
FIG. 8 is a simplified diagram of a computing device for transaction routing server, according to some embodiments.

FIG. 8 is a simplified diagram of a computing device for transaction routing server, according to some embodiments. The computing device 800 may be adopted by the routing server 130 in FIG. 2. As shown in FIG. 8, computing device 800 includes a processor 810 coupled to memory 820. Operation of computing device 800 is controlled by processor 810. And although computing device 800 is shown with only one processor 810, it is understood that processor 810 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 800. Computing device 800 may be implemented as a stand-alone subsystem, as a board added to a computing device, and/or as a virtual machine.

Memory 820 may be used to store software executed by computing device 800 and/or one or more data structures used during operation of computing device 800. Memory 820 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 810 and/or memory 820 may be arranged in any suitable physical arrangement. In some embodiments, processor 810 and/or memory 820 may be implemented on a same board, in a same package (e.g., system-in-package), on a same chip (e.g., system-on-chip), and/or the like. In some embodiments, processor 810 and/or memory 820 may include distributed, virtualized, and/or containerized computing resources. Consistent with such embodiments, processor 810 and/or memory 820 may be located in one or more data centers and/or cloud computing facilities.

In some examples, memory 820 may include non-transitory, tangible, machine readable media that includes executable code that when run by one or more processors (e.g., processor 810) may cause the one or more processors to perform the methods described in further detail herein. For example, as shown, memory 820 includes instructions for a transaction routing module 830 that may be used to implement and/or emulate the systems and models, and/or to implement any of the methods described further herein. In some examples, the transaction routing module 830 may receive an input 840 via a data interface 815, e.g., data records 103*a-n* shown in FIG. 1B, etc., and may generate an output 850, e.g., a routed transaction request having a destination, etc.

The transaction routing module 130 may include an input preprocessing module 831 (performing process 310 in FIG. 3B) and risk simulation module 832 (similar to 105 in FIGS. 1B, 2, 3A, and performing simulation 320 in FIG. 3B). The module 130 and its submodules 831 and 832 may be housed at the same computing device 800, or at distributed servers. The module 130 and its submodules 831 and 832 may be implemented by software, hardware, or a combination of both.

In one embodiment, module 130 and its submodules 831 and 832 may comprise computer readable instructions to be executed by the processor 810 to perform operations as described in FIGS. 1A-7C. Some examples of computing devices, such as computing device 800 may include non-transitory, tangible, machine readable media that include executable code that when run by one or more processors (e.g., processor 810) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In another embodiment, processor 810 may further communicate with one or more ASIC and/or FPGA hardware circuits such as a stochastic simulator 833, a routing lookup table (LUT) 834, which operate in conjunction with transaction routing 830 to route a transaction request in the input 840.

In another implementation, the stochastic simulator 833 and the routing lookup table (LUT) 834 may be implemented via, and/or in conjunction with a plurality of processor-readable instructions.

For example, the stochastic simulator 833 comprise a physical hardware random number generator (HRNG) that utilizes physical processes (e.g., thermal noise, radioactive decay, or semiconductor effects, and/or the like) to generate random numbers. For another example, the random number may be generated based on operating system entropy sources, collected from various hardware events and user interaction; and such entropy sources may be accessed by a system API at server 130 in FIGS. 1A-2.

The stochastic simulator 833 may further generate random distributed numbers from the random numbers according to different types of distributions for the call dynamics, distribution dynamics, economy dynamics and/or fund value dynamics.

For example, the logic may read the current state of the evolution of call dynamics, determine the next state based on the current state and random input from the HRNG, and simulate transition times between transitions. For example, the logic may receive a random number generated by the HRNG and use an inverse transform sampling method to convert the random number into a random waiting time having an exponential distribution, a T-distribution, and/or the like.

The stochastic simulator 833 may further comprise timing circuits to handle event scheduling with the HRNG to simulate the time until the next event such as a capital call or a capital distribution, based on distributions such as the exponential distribution or T-distribution, and to advance the simulation clock accordingly. In this way, the stochastic simulator 833 may simulate the capital call and distribution dynamics and/or other types of dynamics, and/or the like based on processes 300 or 400 from FIGS. 3-4.

In one embodiment, a routing LUT 834 may be used to route a transaction request based on a risk associated with a transaction request, e.g., whether high risk is predicted either in future cash flow, or a malicious requesting source. For example, the routing LUT 834 may comprise a hardware based LUT of a plurality of input pins to receive an input as an address to select a specific entry in a pre-stored table, a memory array (such as implemented using SRAM or other memory technologies) where each possible combination of inputs maps to a predefined output stored at a specific address in the memory, and a plurality of output pins to directly output the associated value. For example, depending on the predicted risk level, the routing LUT 834 may output an address for a destination server (e.g., 180a-180n in FIG. 1A) for routing a corresponding request (e.g., 112a-112n).

In one embodiment, module 130 and its submodule 831 and 832, and circuits 833 and 834 may be jointly generate, by visualization module 833, a visualization of simulated risks such as cash flows, risk levels over time, and/or in response to any real-time change of factors. For example, user interface 815 may display graph plots that illustrate model projection of net asset value (e.g., FIG. 9), simulated cumulative capital call or distribution (FIG. 10A), simulated cash flow or fund value (FIG. 10B), and/or the like. A user may interactively configure, filter, and/or modify desired model parameters, and/or by continuously move a user interface marker on the x-axis of the graph (e.g., representing simulated dates) to update the simulation results for different future periods.

Example Visualization of the Risk-Simulation Based Routing

In one embodiment, risk-simulation results may be interactively displayed at a user interface, e.g., by visualization 833 in FIG. 8. A user may interactively configure, filter, and/or modify desired model parameters, e.g., through the portfolio setting 901 in FIG. 9. In response to the user input, revised simulated results of risk simulation, may be interactively displayed at the user interface.

Figure 9:
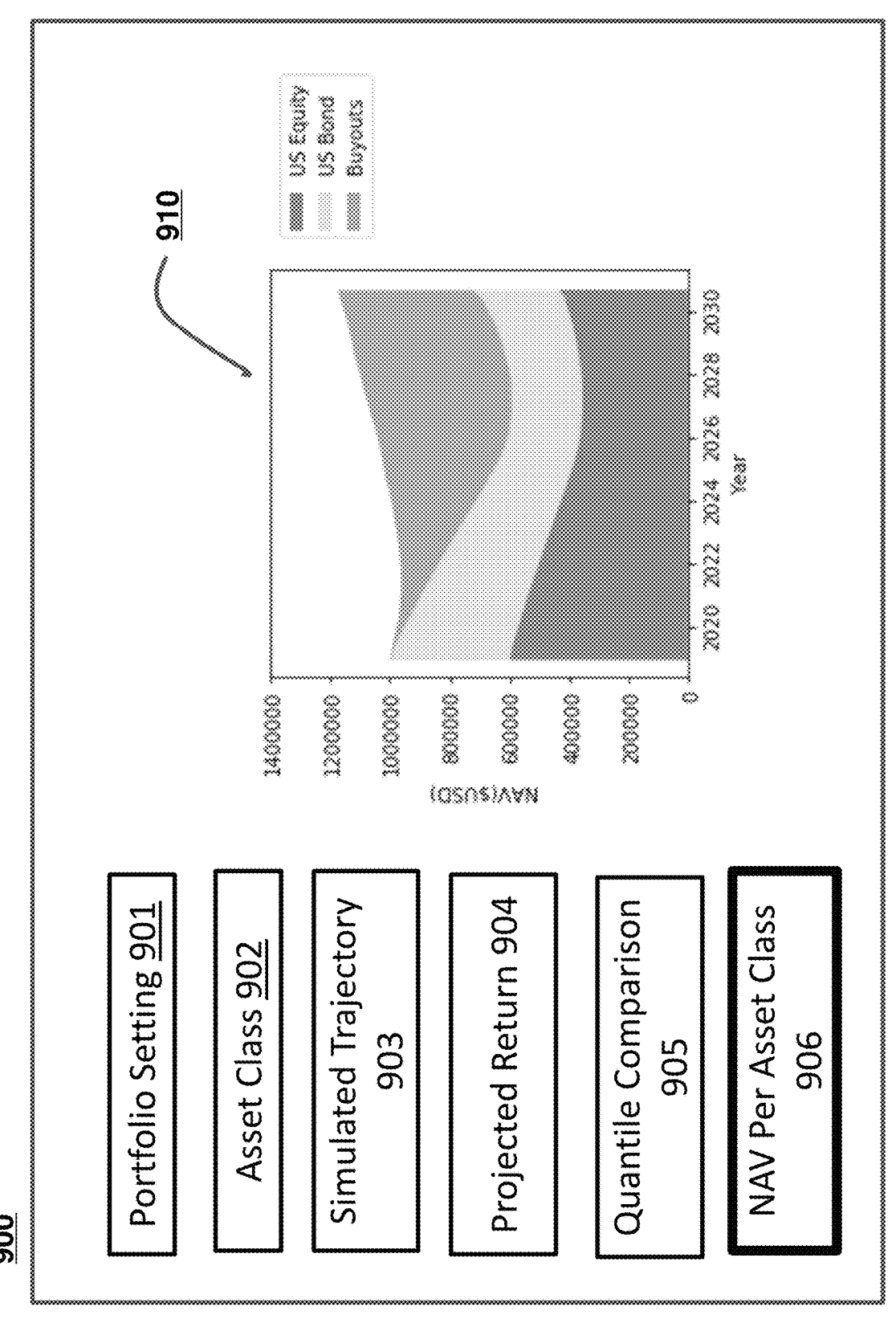
FIG. 9 illustrates an example UI diagram showing an interactive application for PE cash flow and/or net asset value simulation described in FIGS. 1A-7C, according to one or more embodiments described herein.

FIG. 9 illustrates an example UI diagram 900 showing an interactive application for PE cash flow simulation described in FIGS. 1-7C, according to one or more embodiments described herein. In one embodiment, UI 800 may be accessed by user 240 using a user device 110 shown in FIG. 2. User 240 may select portfolio setting 801 to configure simulation parameters, e.g., by selecting data sources, investment amount, and/or the like. In one embodiment, a user may configure and/or choose different fund types for simulation by selecting the asset class 802, e.g., buyout, venture capital, real estate, natural resources, infrastructure, private credit, and/or the like.

Figure 15:
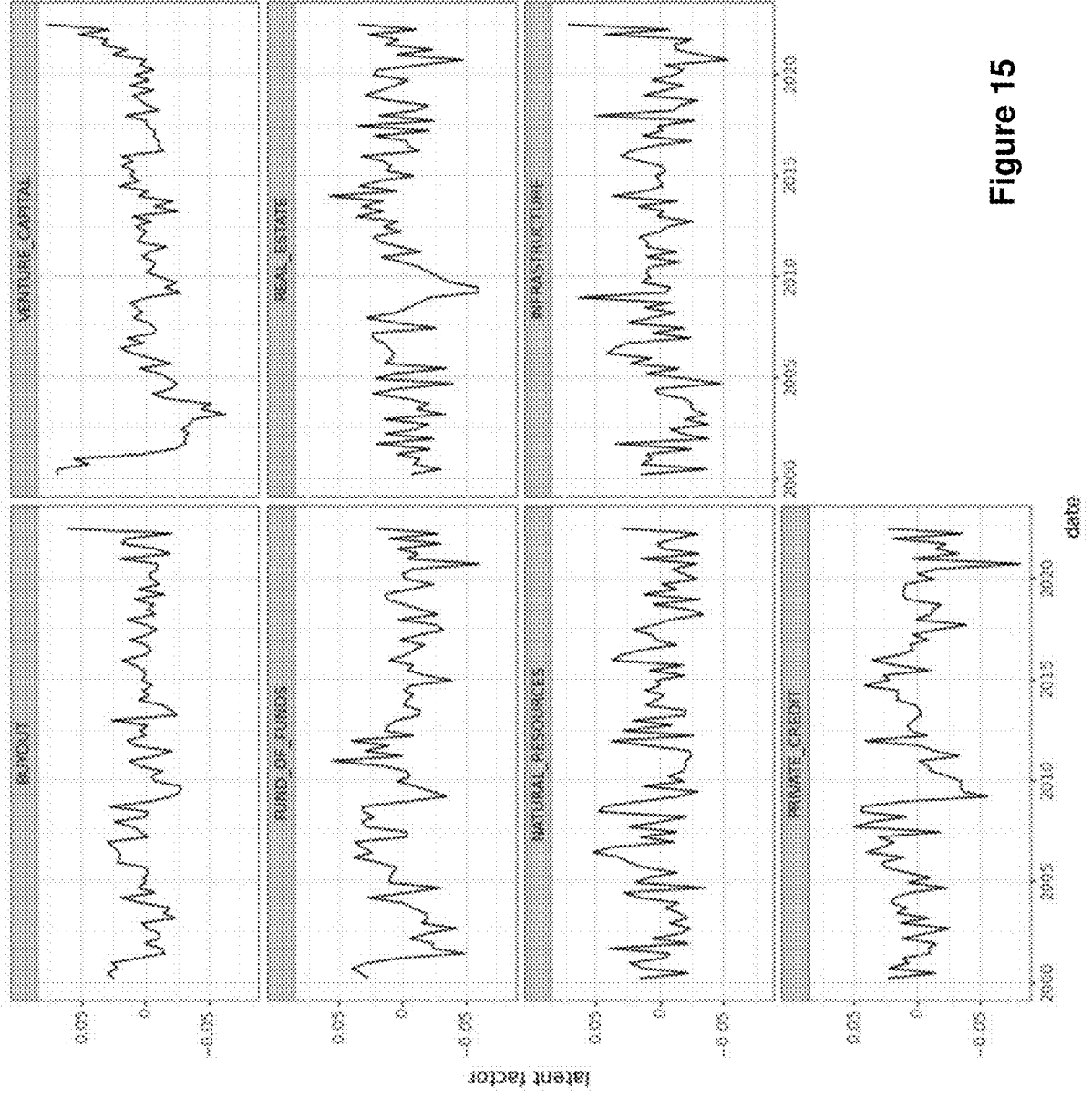
Figure 16:
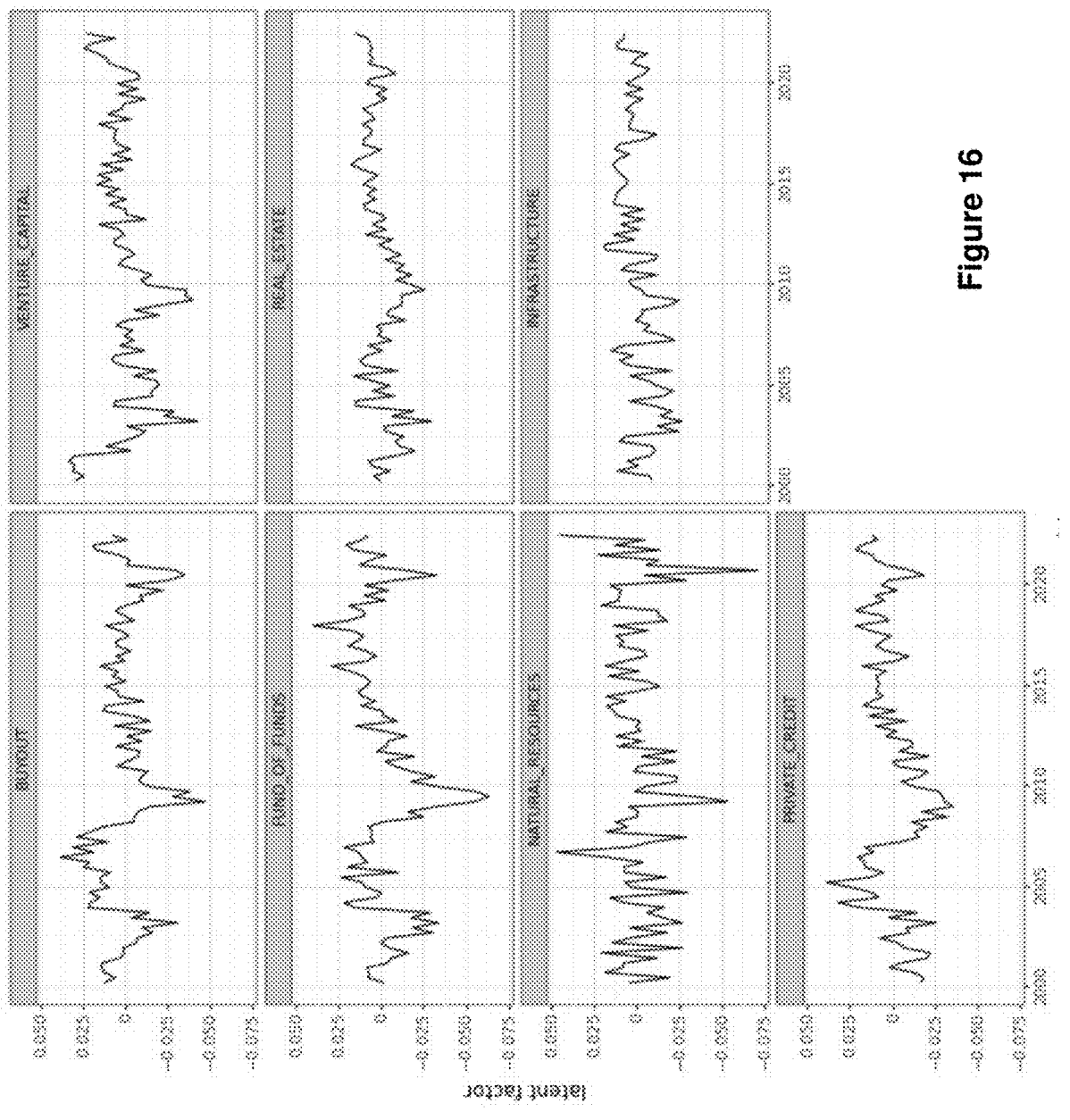
Figure 17:
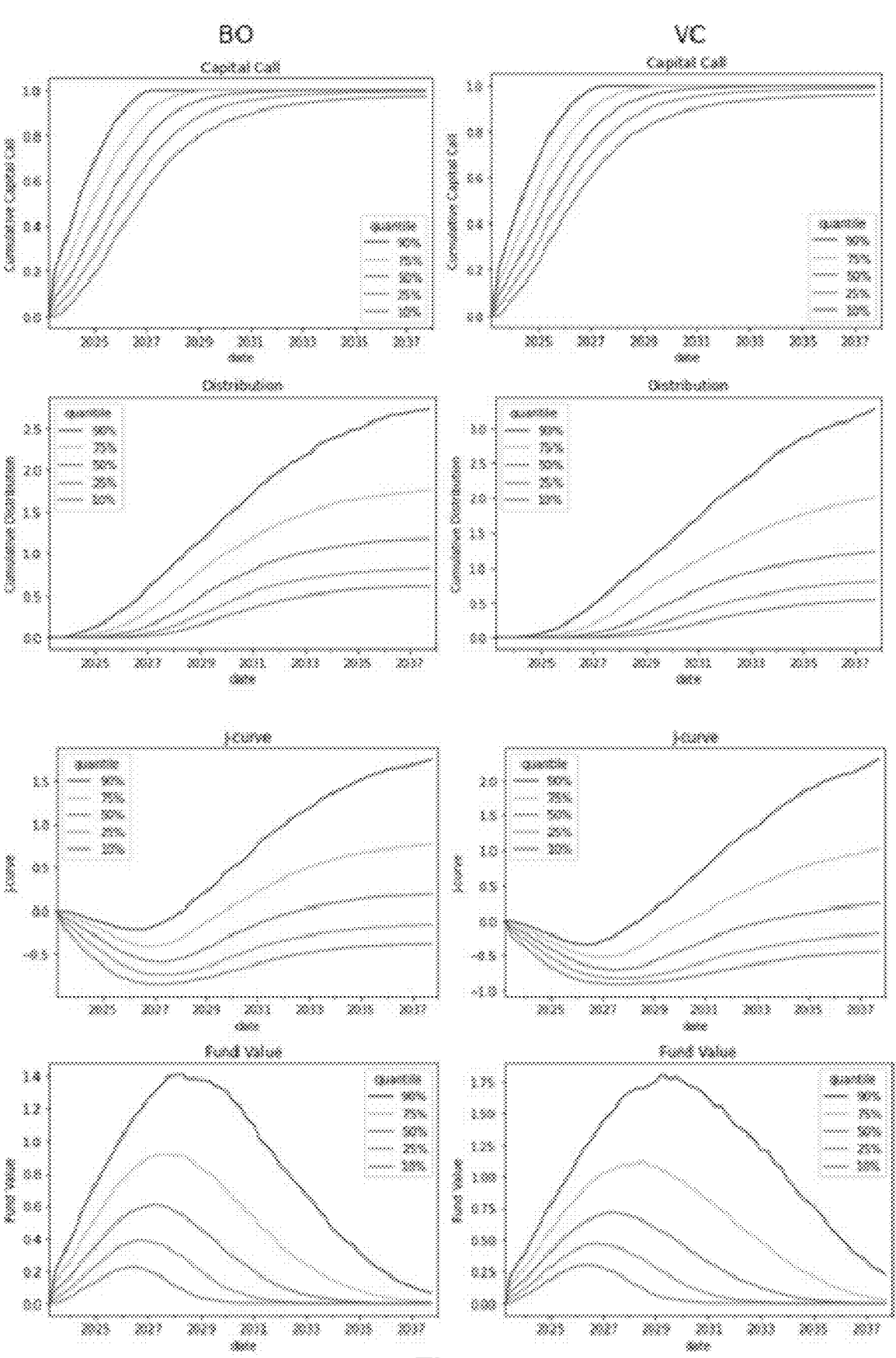
Figure 18:
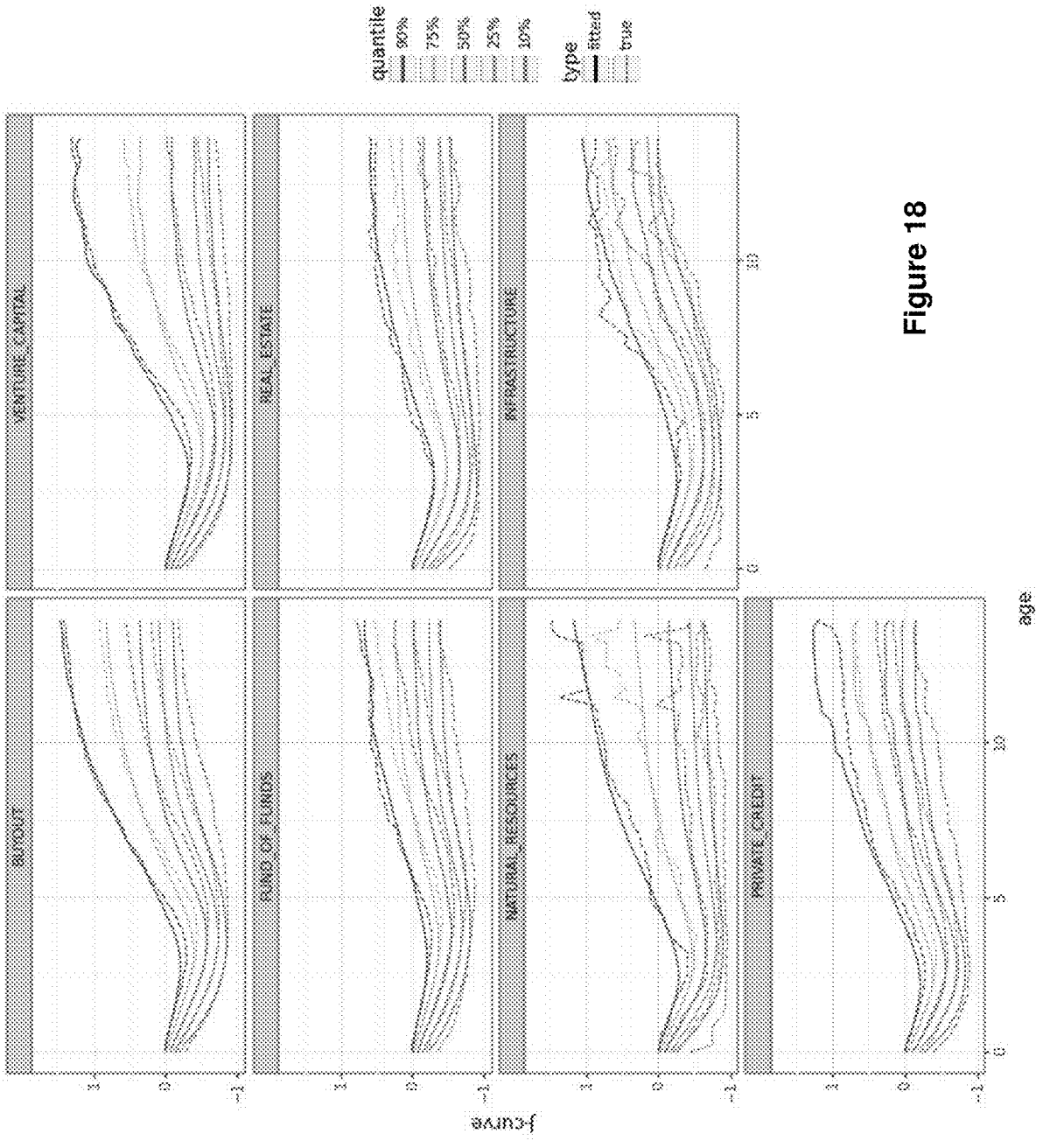
Figure 19:
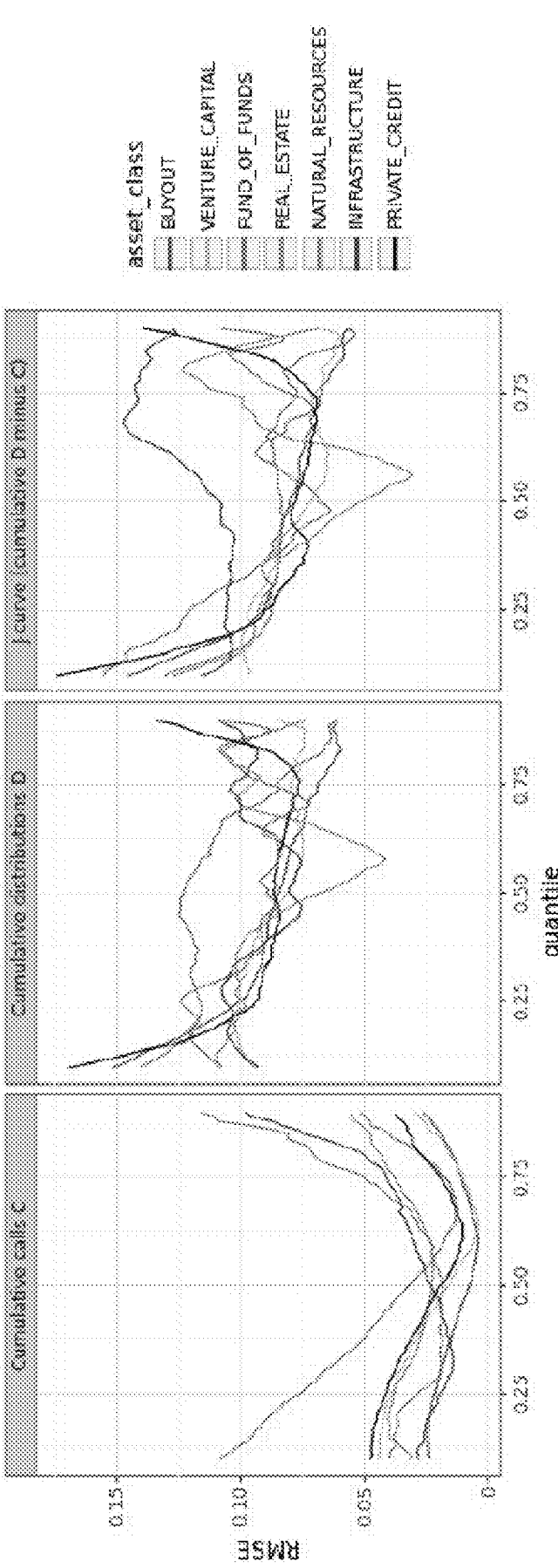

In one embodiment, a user may select different type of visualization of simulation results of cash flow. For example, by selecting simulated trajectory 903, UI may display data plots of time-series estimates of different latent factors of call or distribution as shown in FIGS. 15-16, and/or distributions of simulated fund dynamics of the fund life cycle as shown in FIG. 17. By selecting projected return 904, UI may display portfolio NAV through time, and/or portfolio net cash flow (J-curve) as shown in FIGS. 10A-10C and 20. By selecting quantile comparison 805, UI may display data plots illustrating root mean square error of quantile comparison of simulated call or distribution of different asset classes as shown in FIGS. 18-19. By selecting NAV per asset class 806, UI may display a data plot 910 presenting dollar NAV breakdown of allocations over time, e.g., among US equity, US bond and buyouts, and/or other user configured asset classes.

For example, a user may use the UI diagram 900 to create strategic asset allocation, e.g., for an initial amount of 1 million and a constant annual liability obligation of 7%. The portfolio begins with an all-liquid portfolio of 60% equity (represented by MSCI US index) and 40% risk-free bonds (represented by the 3-month Treasury). The Investor considers a reallocation into illiquid assets to enhance its return profile to meet its liabilities. Assume the investor aggressively commit 20% of initial NAV of the portfolio to private equity funds every year for the next 6 years. So the total commitment will reach 120% of the original NAV over 6 years. All these conditions and parameters may be configured at portfolio setting 901. In one embodiment, the displayed data plot 910 shows dollar NAV breakdown of allocations over time, visualizing a simulation of projected call and distribution events performed by ESS simulator 301 as discussed in relation to FIGS. 3A-3C.

Figure 10A:
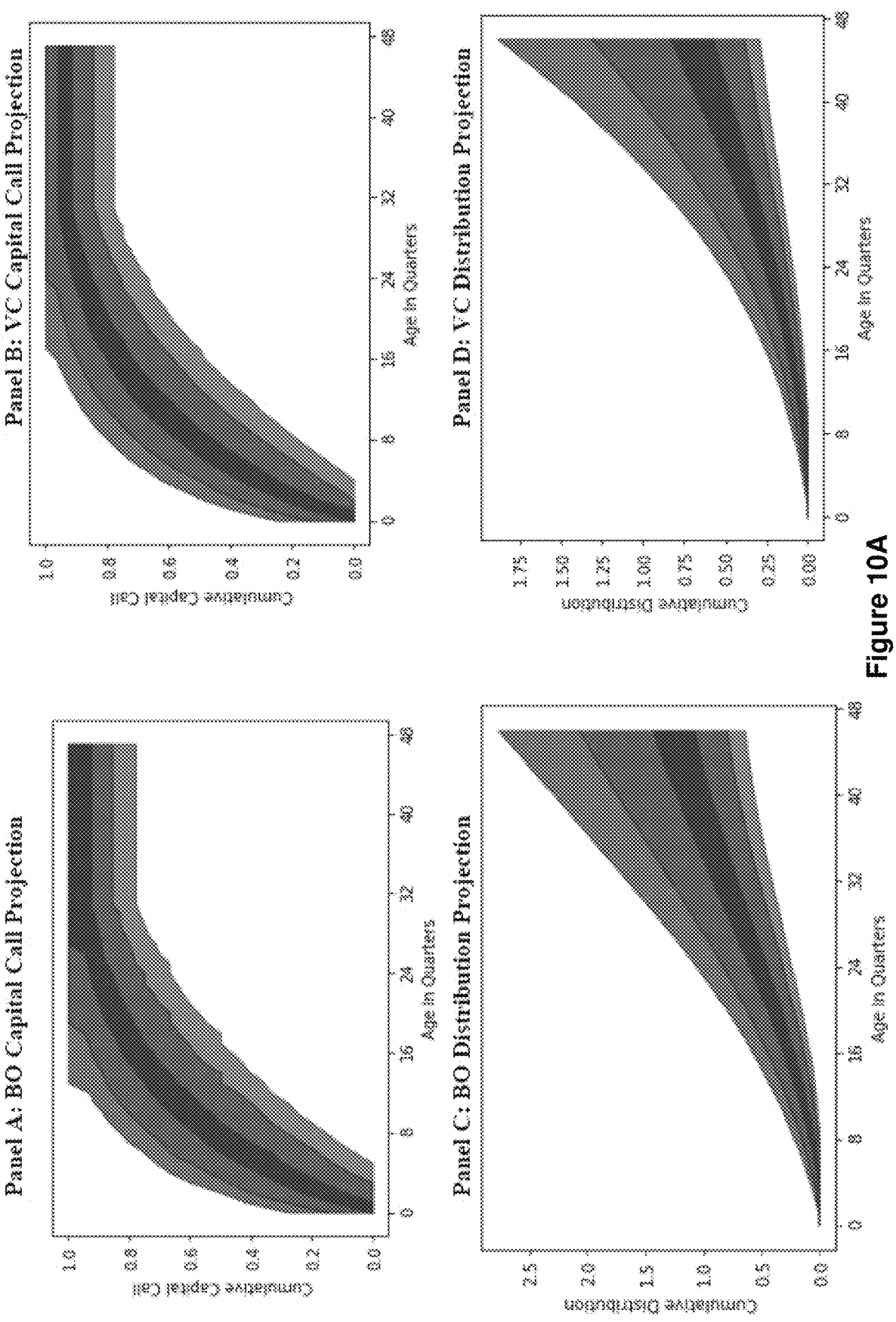
Figure 10B:
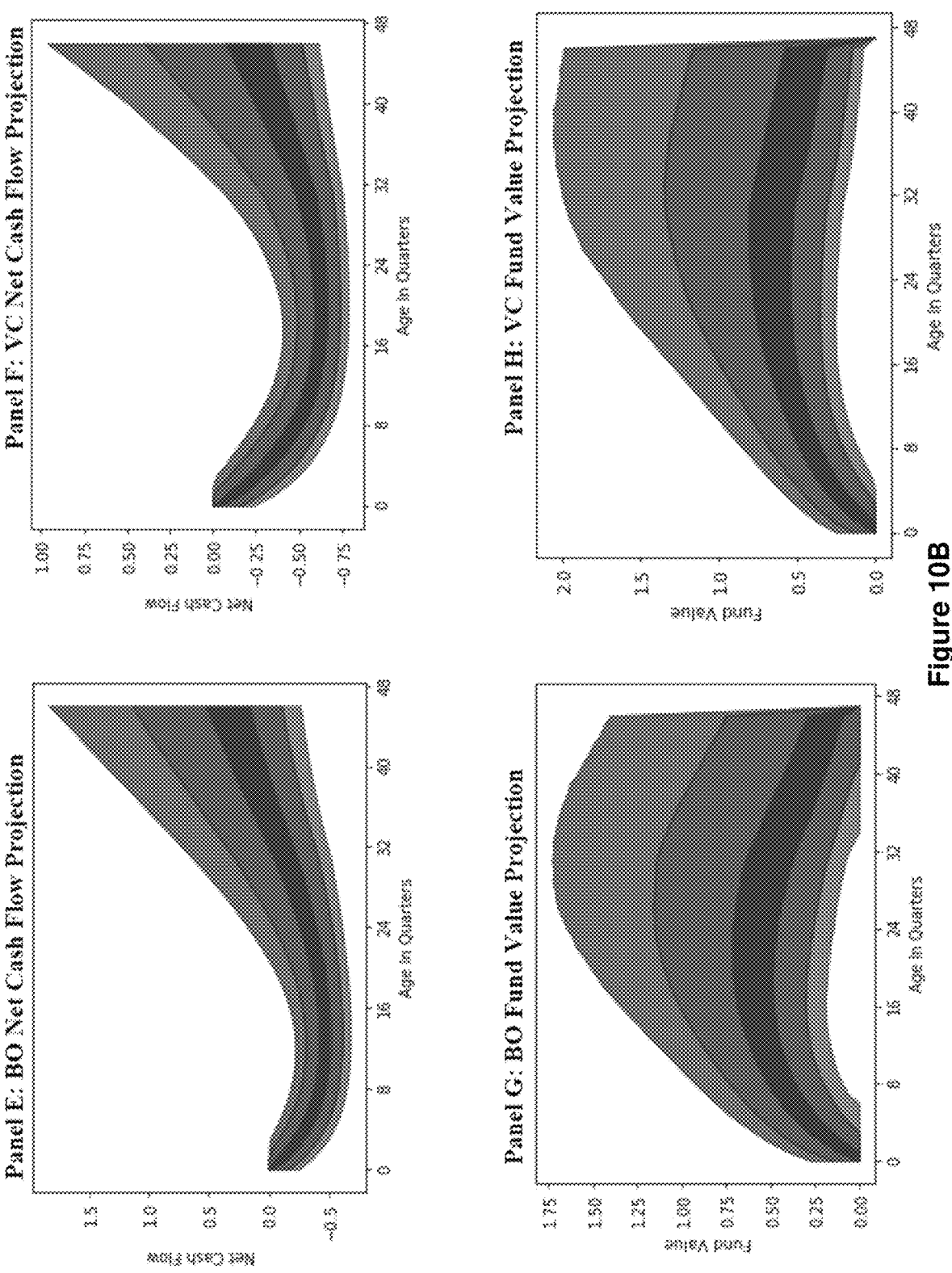

FIGS. 10A-10B illustrate a data plot that may be displayed within an example UI application of FIG. 9, the simulated cumulative capital calls, distributions, net fund cash flows (the "J-curve") and net asset value (NAV) trajectories where darker shading indicates proximity to the median. The reported quantities are scaled as multiples of committed capital. Panels A and B plot the cumulative capital calls. The median BO fund calls all committed capital approximately 8 years from initiation, while a top decile fund is fully invested within 4 years. More than 40% of BO funds fail to fully invest, and the bottom 20% of funds only call 80% of the total commitment. This is contrast with the median VC fund, which calls approximately 90% of committed capital by the end of the investment period.

Panels C and D exhibit a winner-take-all pattern in the distributions. Top decile BO funds deliver a 2.5× multiple on the initial commitment; while the median fund merely breaks even, and the worst performing funds lose up to half of their committed capital. The situation is more severe for VC, where the median fund fails to break even. Comparing across all percentiles, we observe BO funds distributing capital at a higher pace (and magnitude) than VC funds. Panels E and F plot cumulative net cash flows. Distributions naturally lag capital calls, with LPs experiencing a maximum "out-of-pocket" at the trough of the J-Curve. VC typically deploys and harvests slower than BO funds, resulting in longer times to breakeven. Panel G and H plot the projected fund NAVs.

FIG. 11A plots the forecast PnLaR for the simulated BO and VC funds. The simulation framework yields a population large enough to conduct meaningful ex-ante analysis on potential tail events. Two tail metrics are analyzed: (i) "PnL-at-Risk" and (ii) "Cash Balance-at-Risk". The first characterizes the uncertainty of loss in an LP's total position. Assume that the LP warehouses its capital in a risk-free cash account. The LP's extant PnL at t over a horizon h is defined as the sum of projected changes in the fund value and cash position $$PnL_{t,t+h} = \Delta Vt, t+h + \Delta Ct, t+h = (Vt+h+Ct+h) - (Vt+Ct).$$

For a given confidence $\alpha$, the PnL-at-Risk (PnLaR) is defined such that the probability the fund exceeds this PnL threshold is equal to $\alpha$ itself:

$$PnLaR_{t,t+h}(\alpha) \equiv -sup\{x \in R : Prob(PnLt, t+h < x) < \alpha\}$$

Panels A and B show PnLaR measured from fund inception as a function of an expanding forecast horizon. BO fund LPs observe a total value loss of approximately 40% (measured as a fraction of initial commitment) in 4 years at a 1% probability, losing around 20% in 4 years at a 10% confidence. Comparing Panels A and B, we observe that BO funds typically deploy and harvest capital faster than VC. Panels C and D plot PnLaR over a rolling one-year horizon. Note the near-linear profile of Panel D. A BO fund may stem its losses and turnaround even 1% of the time, while the equivalent VC fund continues to lose capital. From this perspective, VC is a significantly riskier investment. Cash flow risk characterizes the timing uncertainty in capital calls and distributions that place funding pressure on an LP. For a given confidence $\alpha$, time t and horizon h, the "Cash Balance-at-Risk" (CBaR) is defined such that the probability of the LP's cash balance experiencing a loss exceeding this threshold is equal to $\alpha$:

$$CBaRt, t+h(\alpha) \equiv -sup\{x \in R : Prob(Ct, t+h < x) < \alpha\}.$$

FIG. 11B shows an example data plot that may be displayed within an example UI application of FIG. 9, summarizes the forecast CBaR. Panels A and B plot CBaR with an expanding horizon measured from fund inception. With a 1% probability, an LP in a BO fund expects 80% of their cash balance to be called over a 4-year horizon. CBaR typically peaks after 16-24 quarters at a level below the initial commitment15. Panels C and D plot CBaR over a rolling one-year horizon. As a fund seasons, the pace of capital calls subsides and distribution velocity increases. This is reflected in the rolling horizon CBaR as it monotonically decreases with fund age. Note that the cash balance is no longer in peril once the investment period winds down.

FIG. 12 shows an example data plot that may be displayed within an example UI application of FIG. 9, which quantifies e distance between the simulated probability distribution and the empirical sample using RMSE (root mean square error). For a given dynamic variable and quantile, the RMSE between the simulated and empirical path is plotted. The solid line corresponds to cumulative capital calls, the dashed line to cumulative distributions and the dash-dotted line to the net cash flows. The RMSE of BO fund capital calls is low across all percentiles, while distributions (and net cash flows) are lowest around the median with large discrepancies in the tails. The average RMSE for all three variables is low, with our simulated net cash flow deviating from realized by 9% of committed capital. The average capital call RMSE for VC funds is similar, but distributions and net cash flows are smaller. The left tail (underperformers) exhibits a particularly good fit.

FIG. 13 shows an example data plot that may be displayed within an example UI application of FIG. 9, which depicts the cross-validation RMSE, quantifying the distance between the simulated probability distributions and the validation sub-sample. The average RMSE is plotted for cumulative capital calls (solid lines), cumulative distributions (dashed lines) and net cash flows (dash-dotted lines). Compared with the in-sample BO and VC results, the average RMSE is 1% to 3% higher for all variables, which is to be expected (the sample sizes used in out-of-sample tests are significantly smaller). The cross-validation RMSE exhibits a similar pattern of being small through the center of the distribution and rising into the tails. That is, calibrating on a partial universe captures the salient features of the retained sample without demonstrating strong over-fit.

Figure 14:
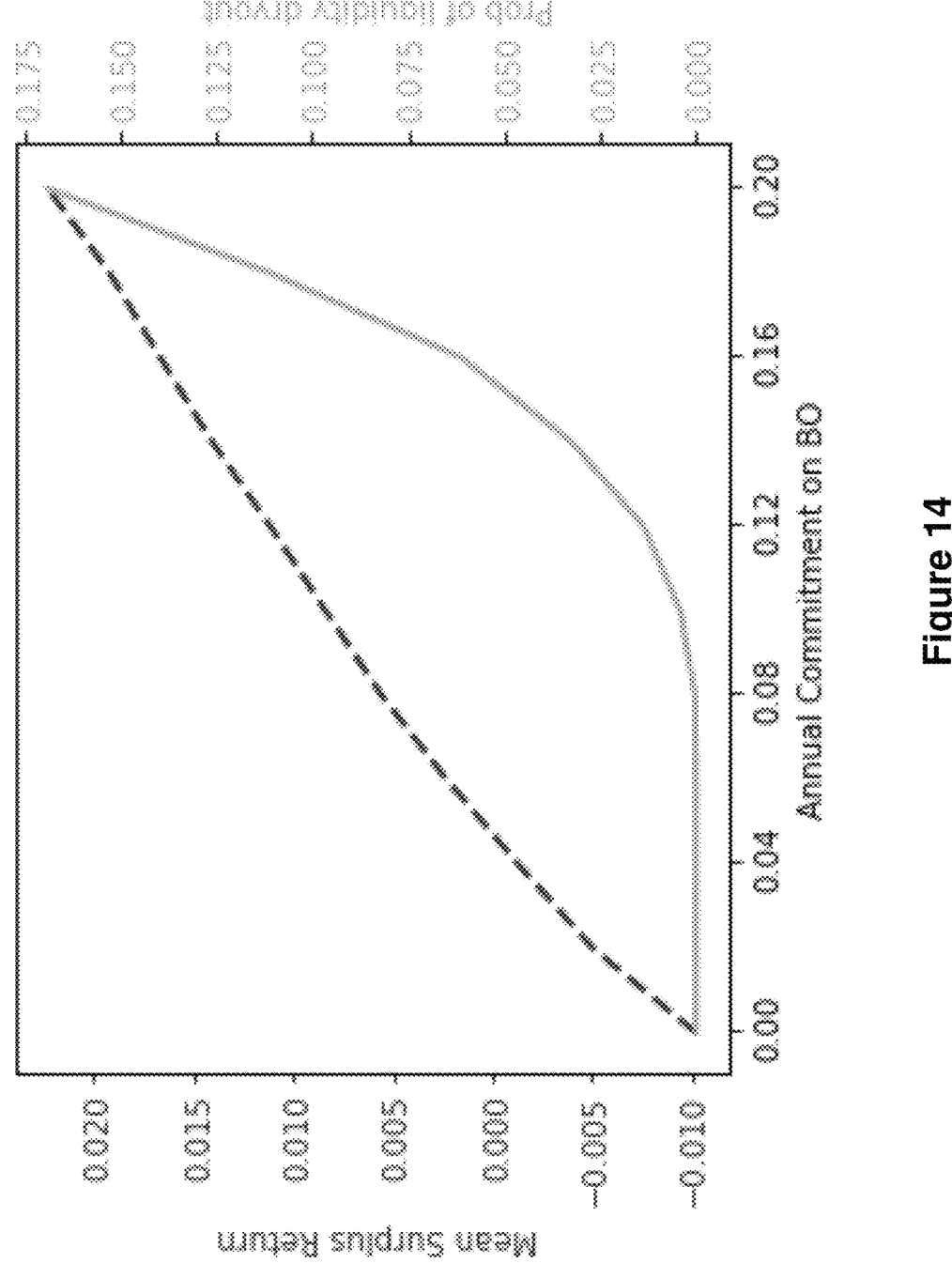

FIG. 14 shows an example data plot that may be displayed within an example UI application of FIG. 9, which plots the annualized 12-year surplus return, and the probability of a liquidity event, against the choice of constant annual commitment (as a percentage of AUM). Mean surplus return is essentially linear under reallocation, starting at approximately −1% with a zero exposure to illiquid assets. A break-even mean surplus of 0% occurs when the fund commits approximately 5% annually. This contrasts with the non-linear probability of a liquidity event, which quickly accelerates under increasingly aggressive reallocation policies. If the pension commits 16% annually, they expect a liquidity event 5% of the time. This quickly reaches a probability of 17.5% as they approach their hypothetical 20% annual commitment. That is, for a range of total commitments below ~50% and under the case study's capital market assumptions, the liquid portfolio (and later the distribution income) meets all funding requirements. However, beyond this point, the plan is heavily reliant on recycling capital distributions which, away from the median case, are quickly outpaced by capital calls.

FIGS. 15-16 shows an example data plot that may be displayed within an example UI application of FIG. 9, which shows time-series estimates of the systematic factors of calls, e.g., $$f_t^C$$

and $$f_t^D.$$

As discussed in relation to FIGS. 3B-3C, the time-series estimates of systematic factors may be obtained from historical fund data records, e.g., by parsing and transforming data records in different formats into time-series data taking a similar format as shown in FIGS. 15-16.

FIG. 17 shows an example data plot that may be displayed within an example UI application of FIG. 9, which shows the simulated cumulative capital calls, distributions, net cash flows (the "J-curve") and NAV trajectories of five key quantiles, 10th, 25th, 50th, 75th, and 90th quantiles. The reported quantities are scaled as multiples of committed capital. The top two plots show the cumulative capital calls. The median BO fund calls all committed capital approximately 8 years from initiation, while a top decile fund is fully invested within 4 years. About 20% of BO funds fail to fully invest, while about 25% of VC funds fail to fully invest. The second row of plots exhibit the cumulative distributions. Top decile BO funds deliver a 2.7× multiple on the initial commitment, while the median fund merely breaks even. The situation is more severe for VC, where the worst performing funds lose up to half of their committed capital. Comparing across all percentiles, BO funds distributes capital at a higher pace (and magnitude) than VC funds.

The "J-curve" plots show the cumulative net cash flows. Distributions naturally lag capital calls, with LPs experiencing a maximum "out-of-pocket" at the trough of the J-Curve. VC typically deploys and harvests slower than BO funds, resulting in longer times to break-even. The last two panels plot the projected fund NAVs.

FIGS. 18-19 shows an example data plot that may be displayed within an example UI application of FIG. 9, which shows plot in solid lines the 10-th, 25-th, 50-th, 75-th, and 90-th percentiles of the simulated distributions of cumulative dynamics, while the dashed lines illustrate the paths of corresponding empirical percentiles.

FIG. 19 shows an example data plot that may be displayed within an example UI application of FIG. 9, which quantifies the discrepancy between the simulated probability distribution and the empirical sample using RMSE (root mean square error). For a given dynamic variable and quantile, the RMSE between the simulated and empirical path is presented. The RMSE of fund capital calls is low especially for BO, VC, real estate, and private debt which have low RMSE across all percentiles. The distributions (and J-curve) RMSEs are in general higher than capital calls' where the median exhibits overall better fit than tails. Table 1.4 summaries the average RMSE for all three variables of all assets. The averages are low especially for BO, VC, and real estate. For example, the simulated J-curve for BO deviates from the realized by 8% of committed capital.

FIG. 20 shows an example data plot that may be displayed within an example UI application of FIG. 9, which shows portfolio NAV, J-curve over time. For example, consider a private equity (PE) portfolio with an annual 20 million commitment to US buyout, the model projects future NAV and net cash flows of this PE portfolio under two scenarios. In FIG. 19, the base line scenario is compared the distressed scenario. The base line scenario uses the latest Capital Market Assumptions. And the distressed scenario assumes a 1% drop in the long term equity risk premium.

In the upper left plot, shaded part 1902 shows the projected range of NAV over time under the base line scenario. The solid line is the median NAV of the portfolio. The shaded part 1904 are made under the "distressed" scenario, which shows lower NAV than those under the base line scenario. The upper right plot shows the projected net cash flows under the two scenarios. In the distressed scenario, the portfolio has lower net cash flows. The bottom plot shows the decomposition of median incremental portfolio NAV by vintage year under the base line scenario. The NAV of each vintage is added on top of the previous vintages. After committing several years, the median portfolio maintains an average of 48 mm allocation.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications

What is claimed is:

1. A routing system for routing a network access request based on a risk level, the routing system comprising:
   a communication interface receiving the network access request comprising information relating to a network application including a plurality of application attributes;
   a memory that stores a plurality of processor-executable instructions;
   one or more processors that reads and executes the plurality of processor-executable instructions from the memory to perform operations comprising:
   decomposing the network application into a set of discrete execution processes, each of which is subject to a respective stochastic entry time and a respective stochastic exit time in and out of the network application, and a respective stochastic waiting time having a hazard-based duration, respectively,
      wherein the respective stochastic entry time or the respective stochastic exit time takes a form of a hazard rate model subject to an exponential process with time-varying coefficients;
   a hardware-based stochastic simulator that:
   conducting a stochastic simulation of entry dynamics or exit dynamics of the set of discrete execution processes based at least in part on simulating a stochastic entry intensity rate or an exit intensity rate according to a hazard rate model, based on the plurality of application attributes; and
   generating, from simulation outputs, a predicted risk level associated with a forecasted demand flow from the network application over a future period;
   wherein the one or more processors further perform operations comprising generating a routing decision for the network access request based on the predicted risk level.

2. The routing system of claim 1, wherein the operations further comprise:
   causing a display of a visualization of the predicted risk level over a period of time on a user interface;
   receiving, via the user interface, a user input that continuously move a marker on the user interface to indicate a changed time period; and
   causing an updated display of a visualization of an updated predicted risk level over the changed time period on the user interface.

3. The routing system of claim 1, wherein the operations of generating the routing decision further comprising:
   declining the network access request when the predicted risk level indicates a high risk; and
   blocking future network access requests from the requestor server or relating to the target server.

4. The routing system of claim 1, wherein the operations of generating the routing decision further comprising:
   routing, by a routing lookup table, the network access request to a destination server when the predicted risk level indicates an acceptable risk.

5. The routing system of claim 1, wherein the network access request comprises a transaction request from a requester server to initiate a transaction with a destination server, and wherein the network application comprises an investment vehicle including a plurality of vehicle attributes.

6. The routing system of claim 5, wherein the plurality of vehicle attributes include any combination of a strategy of the investment vehicle, a total vehicle life, an investment period length, a total commitment.

7. The routing system of claim 5, wherein the respective stochastic entry time or the respective stochastic exit time takes a form of a hazard rate model subject to an exponential process with time-varying coefficients.

8. The routing system of claim 5, further comprising:
   calibrating, using a regression model, one or more entry intensity parameters or exit intensity parameters including a lagged intensity value, an age of the investment vehicle, and a risk-free rate and a market return based on historical capital call intensity data or historical distribution intensity data.

9. The routing system of claim 5, wherein the stochastic simulation includes simulating a capital call intensity rate or a distribution intensity rate for the investment vehicle, based at least in part on:
   (i) obtaining a set of economic factors that drive capital calls, distributions or returns of a set of discrete portfolio investment opportunities decomposed from the investment vehicle;
   (ii) generating the simulated capital call intensity rate or the simulated distribution intensity rate based on the set of economic factors;
   (iii) generating simulated returns from the set of discrete portfolio investment opportunities by drawing the set of discrete portfolio investment opportunities from a Gaussian distribution;
   (iv) generating a simulated entry time and a simulated exit time for each discrete portfolio investment opportunity based on transition probabilities computed from the simulated capital call intensity rate and the simulated distribution intensity rate;
   (v) aggregating simulated activities of the set of discrete portfolio investment opportunities to obtain a capital drawdown, a distribution and a return value for the private equity investment vehicle; and
   (vi) generating a distribution of state variable trajectory corresponding to investment states of the set of discrete portfolio investment opportunities.

10. The routing system of claim 9, wherein the simulated entry time and the simulated exit time are generated by sequentially simulating a set of investment states of each discrete portfolio investment opportunity,
   wherein the set of investment states includes an uninvested state that transits to an invested state according to a first transition probability computed based on the simulated capital call intensity rate, and wherein the invested state transits to a divested state according to a second transition probability computed based on the simulated distribution intensity rate.

11. A method for routing a network access request based on a risk level, the method comprising:

receiving by a communication interface, the network access request comprising information relating to a network application including a plurality of application attributes;

decomposing, by a processor, the network application into a set of discrete execution processes, each of which is subject to a respective stochastic entry time and a respective stochastic exit time in and out of the network application, and a respective stochastic waiting time having a hazard-based duration, respectively, wherein the respective stochastic entry time or the respective stochastic exit time takes a form of a hazard rate model subject to an exponential process with time-varying coefficients;

conducting, by a hardware-based stochastic simulator, a stochastic simulation of entry dynamics or exit dynamics of the set of discrete execution processes based at least in part on simulating a stochastic entry intensity rate or an exit intensity rate according to a hazard rate model, based on the plurality of application attributes;

generating, from simulation outputs, a predicted risk level associated with a forecasted demand flow from the network application over a future period; and generating a routing decision for the network access request based on the predicted risk level.

12. The method of claim 11, further comprising:

causing a display of a visualization of the predicted risk level over a period of time on a user interface;

receiving, via the user interface, a user input that continuously move a marker on the user interface to indicate a changed time period; and causing an updated display of a visualization of an updated predicted risk level over the changed time period on the user interface.

13. The method of claim 11, wherein the generating the routing decision further comprises:

declining the network access request when the predicted risk level indicates a high risk; and blocking future network access requests from the requestor server or relating to the target server.

14. The method of claim 11, wherein the generating the routing decision further comprises:

routing, by a routing lookup table, the network access request to a destination server when the predicted risk level indicates an acceptable risk.

15. The method of claim 1, wherein the network access request comprises a transaction request from a requester server to initiate a transaction with a destination server, and wherein the network application comprises an investment vehicle including a plurality of vehicle attributes.

16. The method of claim 15, wherein the plurality of vehicle attributes include any combination of a strategy of the investment vehicle, a total vehicle life, an investment period length, a total commitment.

17. The method of claim 15, wherein the respective stochastic entry time or the respective stochastic exit time takes a form of a hazard rate model subject to an exponential process with time-varying coefficients.

18. The method of claim 15, further comprising:

calibrating, using a regression model, one or more entry intensity parameters or exit intensity parameters including a lagged intensity value, an age of the investment vehicle, and a risk-free rate and a market return based on historical capital call intensity data or historical distribution intensity data.

19. The method of claim 15, wherein the stochastic simulation includes simulating a capital call intensity rate or a distribution intensity rate for the investment vehicle, based at least in part on:

(i) obtaining a set of economic factors that drive capital calls, distributions or returns of a set of discrete portfolio investment opportunities decomposed from the investment vehicle;

(ii) generating the simulated capital call intensity rate or the simulated distribution intensity rate based on the set of economic factors;

(iii) generating simulated returns from the set of discrete portfolio investment opportunities by drawing the set of discrete portfolio investment opportunities from a Gaussian distribution;

(iv) generating a simulated entry time and a simulated exit time for each discrete portfolio investment opportunity based on transition probabilities computed from the simulated capital call intensity rate and the simulated distribution intensity rate;

(v) aggregating simulated activities of the set of discrete portfolio investment opportunities to obtain a capital drawdown, a distribution and a return value for the private equity investment vehicle; and (vi) generating a distribution of state variable trajectory corresponding to investment states of the set of discrete portfolio investment opportunities.

20. A non-transitory processor-readable storage medium storing a plurality of processor-executable instructions for analyzing or constructing an asset portfolio by simulating private equity cash flows, the processor-executable instructions being executed by a processor to perform operations comprising:

receiving, a communication interface, the network access request comprising information relating to a network application including a plurality of application attributes;

decomposing, by a processor, the network application into a set of discrete execution processes, each of which is subject to a respective stochastic entry time and a respective stochastic exit time in and out of the network application, and a respective stochastic waiting time having a hazard-based duration, respectively, wherein the respective stochastic entry time or the respective stochastic exit time takes a form of a hazard rate model subject to an exponential process with time-varying coefficients;

conducting, by a hardware-based stochastic simulator, a stochastic simulation of entry dynamics or exit dynamics of the set of discrete execution processes based at least in part on simulating a stochastic entry intensity rate or an exit intensity rate according to a hazard rate model, based on the plurality of application attributes;

generating, from simulation outputs, a predicted risk level associated with a forecasted demand flow from the network application over a future period; and generating a routing decision for the network access request based on the predicted risk level.

* * * * *